(12) United States Patent
Moon et al.

(10) Patent No.: US 9,487,646 B2
(45) Date of Patent: *Nov. 8, 2016

(54) CELLULOSE RESIN COMPOSITION

(75) Inventors: Sungil Moon, Tokyo (JP); Masatoshi Iji, Tokyo (JP); Shukichi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 792 days.

This patent is subject to a terminal disclaimer.

(21) Appl. No.: 13/813,608

(22) PCT Filed: Jul. 6, 2011

(86) PCT No.: PCT/JP2011/065436
§ 371 (c)(1),
(2), (4) Date: Aug. 9, 2013

(87) PCT Pub. No.: WO2012/017769
PCT Pub. Date: Feb. 9, 2012

(65) Prior Publication Data
US 2013/0305959 A1    Nov. 21, 2013

(30) Foreign Application Priority Data
Aug. 6, 2010    (JP) .................................. 2010-177950

(51) Int. Cl.
| C08L 1/02 | (2006.01) |
| C08L 83/06 | (2006.01) |
| C08G 77/38 | (2006.01) |
| C08G 77/388 | (2006.01) |
| C08B 3/08 | (2006.01) |
| C08B 3/16 | (2006.01) |
| C08B 3/22 | (2006.01) |
| C08B 15/00 | (2006.01) |
| C08L 1/08 | (2006.01) |
| C08G 77/14 | (2006.01) |

(52) U.S. Cl.
CPC . *C08L 1/02* (2013.01); *C08B 3/08* (2013.01); *C08B 3/16* (2013.01); *C08B 3/22* (2013.01); *C08B 15/00* (2013.01); *C08G 77/38* (2013.01); *C08G 77/388* (2013.01); *C08L 1/08* (2013.01); *C08L 83/06* (2013.01); *C08G 77/14* (2013.01)

(58) Field of Classification Search
CPC .............. C08L 1/02; C08L 1/08; C08B 3/08; C08B 3/16; C08B 3/22
See application file for complete search history.

(56) References Cited

U.S. PATENT DOCUMENTS

| 2,290,861 A | 7/1942 | Campbell |
| 2,290,876 A | 7/1942 | Heany et al. |
| 4,228,277 A | 10/1980 | Landoll |
| 4,663,159 A | 5/1987 | Brode, II et al. |
| 5,124,445 A | 6/1992 | Just et al. |
| 5,504,123 A | 4/1996 | Partan, III |
| 2004/0039145 A1 | 2/2004 | Silva et al. |
| 2008/0262151 A1 | 10/2008 | Ishii et al. |
| 2008/0275204 A1 | 11/2008 | Dai et al. |

FOREIGN PATENT DOCUMENTS

| CN | 101688016 A | 3/2010 |
| JP | 58-122922 A | 7/1983 |
| JP | 63-69846 A | 3/1988 |
| JP | 10-8035 A | 1/1998 |
| JP | 11-255801 A | 9/1999 |
| JP | 2000-19682 A | 1/2000 |
| JP | 2001-32869 A | 2/2001 |
| JP | 2005-535761 A | 11/2005 |
| JP | 2006-111858 A | 4/2006 |

OTHER PUBLICATIONS

Extended European Search Report, dated Nov. 27, 2013, issued by the European Patent Office in counterpart European Application No. 11814399.9.
George John et al., "Grafting of bio-monomers", Polymer Bulletin 1989, pp. 89-94, vol. 22.
International Search Report for PCT/JP2011/065436 dated Aug. 2, 2011.
Communication dated Apr. 30, 2014, issued by the State Intellectual Property Office of the People's Republic of China in corresponding Application No. 201180036084.9.
Mair et al., "Cellulose Bound Chlorophenols II: Preparation and Characterization of Phenyloxycarbonylpentanoyl Celluloses Dependence of Substitution on Chlorophenol Structure", Journal of Applied Polymer Science, Sep. 1987, vol. 34, Issue 4, pp. 1345-1351.
Partain et al., "The Synthesis of Hydrophobe-Modified Hydroxyethyl Cellulose Polymers Using 3-*n*-Pentadecenyl Phenyl Glycidyl Ether", Polymer Preprints, Division of Polymer Chemistry Inc., American Chemical Society, Aug. 1998, vol. 39, No. 2, 3 total pages.

*Primary Examiner* — Alexander Polyansky
(74) *Attorney, Agent, or Firm* — Sughrue Mion, PLLC

(57) ABSTRACT

A cellulose resin composition containing a cellulose resin produced by binding a cardanol or a derivative thereof to cellulose or a derivative thereof, and a cardanol-modified silicone compound produced by binding cardanol or a derivative thereof to a silicone compound.

29 Claims, No Drawings

CELLULOSE RESIN COMPOSITION

TECHNICAL FIELD

The present invention relates to a cellulose resin composition.

BACKGROUND ART

Bioplastic using a plant as a raw material can contribute to a countermeasure against petroleum depletion and global warming, and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As bioplastic using a non-edible part as a raw material, various types of bioplastics using cellulose, which is a main component of non-edible parts of wood and plant, have been already developed and commercialized.

Cellulose is a high molecular weight compound formed by polymerization of β-glucose. Since cellulose has high crystallinity, it is hard, fragile and absent of thermoplasticity. In addition, since cellulose contains many hydroxy groups, water absorbability is high and water resistance is low. Then, various investigations have been made to improve the properties of cellulose.

For example, Patent Literature 1 (JP11-255801A) discloses a biodegradable graft polymer having thermoplasticity obtained by ring-opening graft polymerization of cellulose acetate having a hydroxy group with ε-caprolactone.

Meanwhile, a material using a non-edible component other than cellulose has been developed. For example, cardanol derived from cashew nutshell, since it has stable amount of production and excellent functionality ascribed to its characteristic molecular structure, has found various applications.

As an example of using cardanol, Patent Literature 2 (JP10-8035A) discloses a friction material for brake, which is formed of a fiber base material made of an aramid pulp and a cellulose fiber, and a filler made of calcium carbonate and cashew dust, with the use of a binder made of a phenol resin. Patent Literature 3 (JP2001-32869A) discloses a friction material formed of a base material made of an aramid fiber and a cellulose fiber, and a filler made of graphite and cashew dust, with the use of an organic-inorganic composite binder. It is described that the friction material is applied to clutch facing of a power transmission system of automobiles etc.

In Non Patent Literature 1 (George John et al., Polymer Bulletin, 22, p. 89-94 (1989)), it is described that water resistance of paper can be improved by soaking a paper sheet in cardanol to perform a grafting reaction through which cardanol binds to cellulose constituting the paper sheet. It is described that, in the grafting reaction, a terminal double bond of cardanol binds to a hydroxy group of cellulose in the presence of boron trifluoride diethyl ether ($BF_3$—$OEt_2$).

CITATION LIST

Patent Literature

Patent Literature 1: JP11-255801A
Patent Literature 2: JP10-8035A
Patent Literature 3: JP2001-32869A

Non Patent Literature

Non Patent Literature 1: George John et al., Polymer Bulletin, 22, p. 89-94 (1989)

SUMMARY OF INVENTION

Technical Problem

Cellulose bioplastic, whose properties are influenced by inherent properties of cellulose, is insufficient in strength, heat resistance, water resistance, thermoplasticity, and impact resistance. These properties need to be improved particularly when cellulose bioplastic is applied to durable products such as packaging for electronic devices.

Cellulose bioplastic has another problem. When a plasticizer is added in order to improve thermoplasticity, heat resistance and strength (in particular, rigidity) decrease, and also decrease in uniformity and bleed out of a plasticizer (a plasticizer bleeds out in the surface of a molded product) occur. Furthermore, when a plasticizer formed of a petroleum feedstock is added in a large amount, the utilization ratio of plants (vegetism) decreases. Furthermore, if a general flexible component is added to improve impact resistance, the flexible component bleeds out during a molding process and may affect moldability.

An object of the present invention is to provide a cellulose resin composition having improved impact resistance as well as thermoplasticity, heat resistance, strength, moldability and water resistance.

Solution to Problem

According to an aspect of the present invention, there is provided a cellulose resin composition including:

a cellulose resin produced by binding a cardanol or a derivative thereof to cellulose or a derivative thereof; and a cardanol-modified silicone compound produced by binding cardanol or a derivative thereof to a silicone compound.

According to another exemplary aspect of the present invention, there is provided a molding material including the above cellulose resin composition.

ADVANTAGEOUS EFFECTS OF INVENTION

According to an exemplary embodiment of the present invention, it is possible to provide a cellulose resin composition having improved impact resistance as well as thermoplasticity, heat resistance, strength and water resistance.

DESCRIPTION OF EMBODIMENTS

A cellulose resin composition in accordance with an exemplary embodiment of the present invention is a resin composition containing a cardanol-added cellulose resin produced by chemically binding (grafting) a cardanol or a derivative thereof (hereinafter referred to as "cardanol component") to cellulose (or a derivative thereof), and a cardanol-modified silicone compound produced by chemically binding a cardanol component to a silicone compound.

Owing to a grafting of a cardanol component to cellulose (or a derivative thereof), mechanical characteristics (particularly toughness) and water resistance can be improved. Furthermore, since good thermoplasticity is provided by the grafting, the amount of plasticizer to be added can be reduced or a plasticizer may not be added. As a result, heat resistance and strength (particularly rigidity) can be suppressed from reducing compared to the cellulose resin composition containing a plasticizer, and homogeneity of the resultant resin can be improved. In addition, a problem of bleed out can be overcome. Furthermore, since the addition amount of plasticizer made of a petroleum feedstock can be lowered or reduced to zero, vegetism can be enhanced. In addition, since cellulose and cardanol are both derived from non-edible parts of plants, the utilization ratio of non-edible parts can be increased.

Impact resistance can be improved by adding a cardanol-modified silicone compound to a cardanol-added cellulose resin, followed by mixing them. Furthermore, since compatibility between the cardanol-added cellulose resin and the cardanol-modified silicone compound is high, bleed out of the cardanol-modified silicone compound can be suppressed.

[Cardanol-added Cellulose Resin]

First, a cardanol-added cellulose resin (hereinafter referred to as a "cellulose resin") contained in the cellulose resin composition of the embodiment as a base resin will be described in more detail.

Cellulose is a straight-chain polymer of β-glucose, represented by the following formula (1) and each glucose unit has three hydroxy groups. Using these hydroxy groups, a cardanol component can be grafted.

[Formula 1]

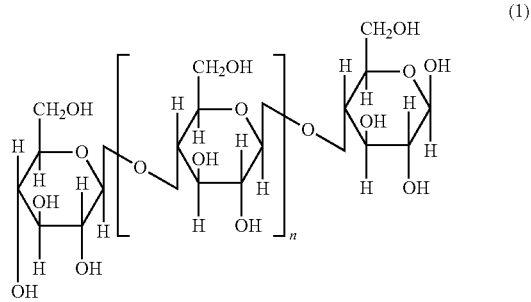
(1)

Cellulose is a main component of plants and can be obtained by a separation treatment for removing other components such as lignin from the plants. Other than the cellulose thus obtained, cellulose obtained by purification of cotton or pulp rich in cellulose content can be used, or the cotton or pulp can be directly used.

The polymerization degree of cellulose (or a derivative thereof) preferably falls within the range of 50 to 5000 and more preferably 100 to 3000 in terms of glucose polymerization degree.

If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose (or a derivative thereof) may be mixed with chitin and chitosan having an analogous structure. When cellulose is mixed with them, the amount thereof is preferably 30% by mass or less relative to the total amount of mixture, preferably 20% by mass or less and further preferably 10% by mass or less.

A cellulose derivative herein refers to cellulose having hydroxy groups partly acylated, etherified or grafted. Specific examples thereof include organic acid esters such as cellulose acetate, cellulose butyrate and cellulose propionate; inorganic acid esters such as cellulose nitrate, cellulose sulfate and cellulose phosphate; mixed esters such as cellulose acetate propionate, cellulose acetate butyrate, cellulose acetate phthalate and cellulose acetate nitrate; and etherified cellulose such as methylcellulose, hydroxyethylcellulose and hydroxypropylcellulose. Furthermore, celluloses grafted with styrene, (meth)acrylic acid, (meth)acrylate, ε-caprolactone, lactide, glycolide, etc. are included These acylated cellulose, etherified cellulose and grafted cellulose may be used singly or in combination of two or more types.

As the cellulose (or a derivative thereof) of the exemplary embodiment, for example, at least one acylated cellulose selected from a cellulose acetate, cellulose propionate and cellulose butyrate, which have hydroxy groups partially acylated, can be preferably used.

The term "cellulose derivative" used herein includes both a cellulose compound, and a compound having a cellulose skeleton, obtained by biologically or chemically introducing a functional group into raw-material cellulose.

Cardanol is a component contained in the shell of cashew nut, and is an organic compound represented by the following formula (2), which has a phenol moiety and a straight-chain hydrocarbon moiety. There are 4 types of cardanols different in the number of unsaturated bonds in the straight-chain hydrocarbon moiety R. Usually, cardanol is a mixture of these 4 components. To be more specific, cardanol is a mixture of 3-pentadecylphenol, 3-pentadecylphenol monoene, 3-pentadecylphenol diene and 3-pentadecylphenol triene, described in the following formula (2). A cardanol component obtained by extracting and purifying from a cashew nutshell liquid can be used.

[Formula 2]

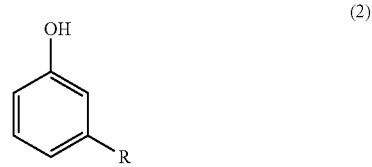
(2)

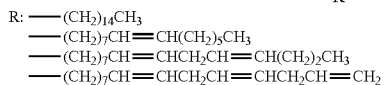

The straight-chain hydrocarbon moiety of cardanol contributes to improving flexibility and hydrophobicity of a resin, whereas the phenol moiety has a highly reactive phenolic hydroxy group for use in grafting. When such a cardanol component is grafted to cellulose (or a derivative thereof), a cellulose structure to which the cardanol component is added like bristles is formed. As a result, cardanol bristles thus grafted interact with each other to improve mechanical characteristics (particularly toughness), as well as to impart thermoplasticity. In addition, owing to hydrophobicity of cardanol, water resistance can be improved.

Grafting can be performed through a binding reaction by dehydration between the phenolic hydroxy group of a cardanol component and a hydroxy group of cellulose (or a derivative thereof). At this time, a dehydration catalyst such as sulfuric acid, toluene sulfonic acid and hydrogen chloride can be added. As a result, a cellulose carbon atom to which a hydroxy group of cellulose (or a derivative thereof) is bound and a cardanol carbon atom to which the phenolic hydroxy group of a cardanol component is bound are linked via an oxygen atom.

Also, grafting can be performed by use of a multifunctional compound capable of reacting with a hydroxy group and the phenolic hydroxy group of cardanol. As a result, a cellulose carbon atom to which a hydroxy group of cellulose (or a derivative thereof) is bound and a cardanol carbon atom to which the phenolic hydroxy group of a cardanol component is bound are linked via an organic linking group. According to such grafting, efficiency of a grafting reaction can be improved and a side reaction can be suppressed.

The organic linking group may have a first bond binding to the cellulose carbon atom, the bond being selected from an ester bond, an ether bond and a urethane bond, and a second bond binding to the cardanol carbon atom, the bond being selected from an ester bond, an ether bond and a urethane bond.

For example, the multifunctional compound and cardanol are bound by use of the phenolic hydroxy group of cardanol and a functional group of the multifunctional compound to obtain a cardanol derivative. The resultant cardanol derivative and cellulose (or a derivative thereof) can be bound by use of a hydroxy group of cellulose (or a derivative thereof) and the functional group (the functional group derived from the multifunctional compound) of the cardanol derivative.

According to the aforementioned grafting, the hydroxy group of cellulose (or a derivative thereof) and the phenolic hydroxy group of a cardanol component are eliminated to form a graft bond; at the same time, the hydrophobic structure of cardanol can be introduced into cellulose (or a derivative thereof) to improve water resistance.

To graft a cardanol component to cellulose (or a derivative thereof), the phenolic hydroxy group of cardanol and a hydroxy group of cellulose are preferably used as mentioned above in view of efficiency of a grafting reaction, resultant molecular structure and water resistance. Since such grafting is made by use of a highly-reactive phenolic hydroxy group, more efficient grafting can be realized compared to grafting using an unsaturated bond (double bond) of the straight-chain hydrocarbon moiety of cardanol. Furthermore, according to the grafting of the exemplary embodiment, since the phenol moiety of cardanol reacts with cellulose and fixed to it, mutual interaction between straight-chain hydrocarbon moieties of the grafted cardanol molecules enhances, and thus a desired effect of improving mechanical characteristics can be obtained. Furthermore, in the exemplary embodiment, since grafting is performed by eliminating the phenolic hydroxy group of cardanol, water resistance can be improved (suppressing water absorbability) compared to grafting that does not use a phenolic hydroxy group. Also from this point of view, the grafting of the exemplary embodiment is advantageous.

The aforementioned multifunctional compounds and organic linking groups preferably include a hydrocarbon group. The number of carbon atoms of the hydrocarbon group is preferably 1 or more and more preferably 2 or more, and also preferably 20 or less, more preferably 14 or less and further preferably 8 or less. If the number of carbon atoms is excessively large, the molecule becomes excessively large and thus reactivity reduces. As a result, it is often difficult to increase a grafting rate. As such a hydrocarbon group, a divalent group is preferable. Examples thereof include a divalent straight-chain aliphatic hydrocarbon groups (particularly, straight-chain alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as a cycloheptane ring group, a cyclohexane ring group, a cyclooctane ring group, a bicyclopentane ring group, a tricyclohexane ring group, a bicyclooctane ring group, a bicyclononane ring group and a tricyclodecane ring group; divalent aromatic hydrocarbon groups such as a benzene ring group, a naphthalene ring group and a biphenylene group; and divalent groups composed of combinations of these.

When the hydrocarbon group as mentioned above is an aromatic hydrocarbon group or an alicyclic hydrocarbon group, because of its stiffness, the rigidity of the resultant resin can be improved. In contrast, when the hydrocarbon group is a straight-chain aliphatic hydrocarbon group, because of its flexibility, the toughness of the resultant resin can be improved.

As a functional group of a multifunctional compound as mentioned above, a group selected from a carboxyl group, a carboxylic acid anhydride group, a carboxylic halide group (particularly, carboxylic chloride group), an epoxy group, an isocyanate group and a halogen group is preferred. Of them, a carboxyl group, a carboxylic acid anhydride group, a halogen group (particularly, a chloride group) and an isocyanate group are preferred. As the functional group to be reacted with the phenolic hydroxy group of cardanol, particularly, a carboxylic acid anhydride group, a halogen group (particularly, chloride group) and an isocyanate group are preferred. As the functional group to be reacted with a hydroxy group of cellulose, particularly, a carboxylic halide group (particularly, a carboxylic chloride group) and an isocyanate group are preferred. The carboxylic halide group can be formed by converting a carboxyl group into an acid halide group before grafting.

Specific examples of such a multifunctional compound include dicarboxylic acid, carboxylic acid anhydride, dicarboxylic acid halide, monochlorocarboxylic acid, and diisocyanates. Examples of the dicarboxylic acid include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic acid anhydride include anhydrides of these dicarboxylic acids. Examples of the dicarboxylic acid halide include acid halides of these dicarboxylic acids. Examples of the monochlorocarboxylic acid include monochloroacetic acid, 3-chloropropionic acid, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of the diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanatemethyloctane, lysine ester triisocyanate, 1,3,6-hexamethylene triisocyanate, bicycloheptane triisocyanate and dicyclohexylmethane diisocyanate (HMDI: hydrogenated MDI). Of these, tolylene diisocyanate (TDI), 4,4'-diphenylmethane diisocyanate (MDI) and 1,6-hexamethylene diisocyanate (HDI) can be preferably used.

One of the functional groups of a multifunctional compound as mentioned above and the phenolic hydroxy group of cardanol are reacted to form a cardanol derivative, and then, the cardanol derivative is bound to cellulose (or a derivative thereof) by use of a hydroxy group of cellulose (or a derivative thereof) and the functional group (derived from the multifunctional compound) of the cardanol derivative.

For example, a carboxylic acid-based multifunctional compound (dicarboxylic acid, carboxylic acid anhydride or monochloro carboxylic acid) is reacted with cardanol, the phenolic hydroxy group of the cardanol and a functional group of the multifunctional compound (carboxyl group, carboxylic acid anhydride group or halogen group (particularly, chloride group)) are reacted to form a cardanol derivative, and the remaining functional group (carboxyl group) is converted into a carboxylic halide group (particularly, carboxylic chloride group). The cardanol derivative is reacted with cellulose (or a derivative thereof) to react a hydroxy group of the cellulose (or a derivative thereof) with the carboxylic halide group of the cardanol derivative. In this way, grafting can be performed. In this case, grafting can be extremely efficiently performed.

As a result of grafting using a multifunctional compound, the cellulose carbon atom to which a hydroxy group of cellulose (or a derivative thereof) is bound and the hydrocarbon group of a multifunctional compound are allowed to bind, for example, via an ester bond, an ether bond or a urethane bond, preferably via an ester bond; whereas the cardanol carbon atom to which the phenolic hydroxy group of a cardanol component is bound and the hydrocarbon group of the multifunctional compound are allowed to bind, for example, via an ester bond, an ether bond or a urethane bond, preferably via an ester bond or an ether bond.

An unsaturated bond(s) (double bond) of the straight-chain hydrocarbon moiety of the cardanol are preferably hydrogenated and converted into a saturation bond. The conversion rate (hydrogenation rate) of the unsaturated bonds by hydrogenation is preferably 90% by mole or more and more preferably 95% by mole or more. After hydrogenation, the residual ratio (the number of unsaturated bonds per cardanol molecule) of unsaturated bonds of the cardanol is preferably 0.2 (bond/molecule) or less and more preferably 0.1 (bond/molecule) or less.

When a cardanol component, in which a large number of unsaturated bonds of the straight-chain hydrocarbon moiety still remain, is grafted to cellulose (or a derivative thereof), a side reaction likely to occur, with the result that grafting cannot be efficiently performed and the solubility of a grafted product in a solvent may often significantly reduce. When a cardanol derivative in which an unsaturated bond(s) of the straight-chain hydrocarbon moiety are sufficiently converted into saturated bonds by hydrogenation, is grafted, grafting can be efficiently performed while suppressing a side reaction and in addition, solubility reduction of a grafted product in a solvent can be suppressed.

The hydrogenation method is not particularly limited and a method known in the art can be used. Examples of the catalyst include a noble metal such as palladium, ruthenium and rhodium, nickel, and a substance made by immobilizing a metal selected from these on a carrier such as activated carbon, activated alumina and diatom earth. As the reaction system, a batch system in which a reaction is performed while suspending and stirring a powdery catalyst and a continuous system using a reaction tower charged with a molded catalyst can be employed. The solvent for hydrogenation may not be used depending upon the system of hydrogenation. However, when a solvent is used, examples of the solvent include alcohols, ethers, esters and saturated hydrocarbons generally. The reaction temperature for hydrogenation is not particularly limited; however, it can be usually set to 20 to 250° C. and preferably 50 to 200° C. If the reaction temperature is excessively low, a hydrogenation rate becomes low. Conversely, if the reaction temperature is excessively high, the amount of decomposition product may increase. The hydrogen pressure during the hydrogenation can be usually set to 10 to 80 kgf/cm$^2$ ($9.8 \times 10^5$ to $78.4 \times 10^5$ Pa) and preferably 20 to 50 kgf/cm$^2$ ($19.6 \times 10^5$ to $49.0 \times 10^5$ Pa).

Hydrogenation can be performed before the cardanol derivative is formed, after the cardanol derivative is formed and before the cardanol derivative is grafted, or after the cardanol derivative is grafted; however, in view of the reaction efficiency of hydrogenation and grafting reaction, hydrogenation is preferably performed before the cardanol derivative is grafted and further preferably before the cardanol derivative is formed.

The ratio (grafting rate) of a cardanol component bound to cellulose (or a derivative thereof) relative to the cellulose (or a derivative thereof) is represented by the number (average value) of cardanol components to be added per glucose unit of cellulose (or a derivative thereof), in other words, the number (average value) of hydroxy groups bound to a cardanol component per glucose unit of cellulose (or a derivative thereof) (the degree of substitution of the hydroxy group, $DS_{CD}$). $DS_{CD}$ is preferably 0.1 or more, and more preferably 0.2 or more. $DS_{CD}$ may be set to 0.4 or more. When $DS_{CD}$ is excessively low, the effect by grafting may not be sufficiently obtained.

The maximum value of $DS_{CD}$ is theoretically "3"; however, in view of facilitating production (grafting), $DS_{CD}$ is preferably 2.5 or less, more preferably 2 or less and further preferably 1.5 or less. Furthermore, $DS_{CD}$ may be 1 or less; even in this case, sufficient improvement effect can be obtained. If $DS_{CD}$ increases, tensile breaking strain (toughness) tends to increase; whereas, the maximum strength (tensile strength, bending strength) tends to decrease. Accordingly, $DS_{CD}$ is preferably set appropriately in accordance with desired properties.

A cardanol component is grafted, and further a specific reactive hydrocarbon compound may be grafted to cellulose (or a derivative thereof). Owing to this, a cellulose resin can be improved so as to have desired properties.

This reactive hydrocarbon compound is a compound having at least one functional group capable of reacting with a hydroxy group of cellulose (or a derivative thereof). Examples thereof include hydrocarbon compounds having a carboxyl group, a carboxylic halide group, or a carboxylic acid anhydride group. Specific examples thereof include at least one compound selected from monocarboxylic acids such as an aliphatic monocarboxylic acid, an aromatic monocarboxylic acid and an alicyclic monocarboxylic acid, and acid halides or acid anhydrides thereof. Examples of the aliphatic monocarboxylic acid include straight and branched (having a side chain) fatty acids. Examples of the aromatic monocarboxylic acid include an aromatic monocarboxylic acid having a carboxyl group directly bound to an aromatic ring, and an aromatic monocarboxylic acid having a carboxyl group bound to the aromatic ring via an alkylene group (for example, methylene group, ethylene group) (the acid having an aliphatic carboxylic acid group bound to the aromatic ring). Examples of the alicyclic monocarboxylic acid include an alicyclic monocarboxylic acid having a carboxyl group directly bound to an alicycle, and an alicyclic monocarboxylic acid having a carboxyl group bound to an alicycle via an alkylene group (for example, methylene group, ethylene group) (the acid having an aliphatic carboxylic acid group bound to an alicycle).

The reactive hydrocarbon compound preferably has carbon atoms within the range of 1 to 32 and more preferably within the range of 1 to 20. If the number of carbon atoms is excessively large, the size of the molecule becomes excessively large and reaction efficiency decreases due to steric hindrance. As a result, it becomes difficult to increase a grafting rate.

The reactive hydrocarbon compound is effective in improving properties in the case where it is particularly arranged so as to bury gaps in a sterical structure composed of a grafted cardanol component.

When the hydrocarbon group of the reactive hydrocarbon compound is an aromatic hydrocarbon group and an alicyclic hydrocarbon group, it efficiently works to particularly improve rigidity and heat resistance. When the hydrocarbon group is an aliphatic hydrocarbon group, it efficiently works to particularly improve toughness.

Examples of the aliphatic monocarboxylic acid to be used as the reactive hydrocarbon compound include saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; unsaturated fatty acids such as butenoic acid, pentenoic acid, hexenoic acid, octenoic acid, undecylenic acid, oleic acid, sorbic acid, linoleic acid, linolenic acid and arachidonic acid; and derivatives of these. These may further have a substituent.

Examples of the aromatic monocarboxylic acid used as the reactive hydrocarbon compound include an aromatic carboxylic acid having a carboxyl group introduced in a benzene ring such as benzoic acid; an aromatic carboxylic acid having an alkyl group introduced in a benzene ring such as toluic acid; an aromatic carboxylic acid having an aliphatic carboxylic acid group introduced in a benzene ring such as phenylacetic acid and phenyl propionic acid; an aromatic carboxylic acid having two or more benzene rings such as biphenylcarboxylic acid and biphenylacetic acid; an aromatic carboxylic acid having a condensed-ring structure such as naphthalene carboxylic acid and tetralin carboxylic acid; and derivatives of these.

Examples of the alicyclic monocarboxylic acid to be used as the reactive hydrocarbon compound include an alicyclic monocarboxylic acid having a carboxyl group introduced to an alicycle such as cyclopentane carboxylic acid, cyclohexane carboxylic acid and cyclooctane carboxylic acid; alicyclic monocarboxylic acids having an aliphatic carboxylic acid introduced in an alicycle such as cyclohexyl acetic acid; and derivatives of these.

If an organic silicon compound and an organic fluorine compound are added to these reactive hydrocarbon compound structures, properties such as water resistance can be more effectively improved.

As the reactive functional groups of these reactive hydrocarbon compounds, any reactive functional groups are used as long as they can react with a hydroxy group of cellulose. Examples thereof include a carboxyl group, a carboxylic acid halide group (particularly, a carboxylic acid chloride group), and a carboxylic acid anhydride, and further include an epoxy group, an isocyanate group and a halogen group (particularly, a chloride group). Of these, a carboxyl group and a carboxylic halide group are preferable and a carboxylic acid chloride group is particularly preferable. Examples of the carboxylic acid halide group (particularly, a carboxylic acid chloride group) include an acid halide group (particularly, an acid chloride group) in which a carboxyl group of each of the carboxylic acids mentioned above is acid-halogenated.

As the reactive hydrocarbon compound used in the exemplary embodiment, particularly in view of rigidity (bending strength, etc.) of a resin, at least one monocarboxylic acid selected from aromatic carboxylic acids and alicyclic carboxylic acids, or an acid halide or acid anhydride thereof are preferable. By adding such a reactive hydrocarbon compound to a cellulose hydroxy group, a structure formed by adding an acyl group derived from at least one monocarboxylic acid selected from aromatic carboxylic acids and alicyclic carboxylic acids to a hydroxy group (i.e., a structure obtained by substituting a hydrogen atom of a cellulose hydroxy group with an acyl group) can be obtained.

The number (average value) of reactive hydrocarbon compounds (the number of acyl groups) to be added per glucose unit of cellulose (or a derivative thereof), in other words, the number (average value) of hydroxy groups bound to a reactive hydrocarbon compound per glucose unit (the degree of substitution of the hydroxy group, $DS_{XX}$) is, in view of obtaining a desired effect, preferably 0.1 or more and 0.6 or less and more preferably 0.1 or more and 0.5 or less. Furthermore, after a cardanol component and a reactive hydrocarbon compound are grafted, the number (average value) of remaining hydroxy groups per glucose unit (hydroxy group remaining degree, $DS_{OH}$) is, in view of sufficiently ensuring water resistance, preferably 0.9 or less and more preferably, 0.7 or less.

The reactive hydrocarbon compound can be grafted in the grafting step of a cardanol component. Owing to this, grafting can be made uniformly. At this time, these may be added simultaneously or separately. However, if a cardanol component is grafted and thereafter a reactive hydrocarbon compound is added and grafted, the efficiency of a grafting reaction can be improved.

A grafting treatment can be performed by heating cellulose (or a derivative thereof) and a cardanol component, if necessary, a reactive hydrocarbon compound in a solvent dissolving them at an appropriate temperature. Cellulose is rarely dissolved in a general solvent; however dissolved in e.g., a dimethylsulfoxide-amine solvent, a dimethylformamide-chloral-pyridine solvent, a dimethylacetamide-lithium chloride solvent and an imidazolium ionic liquid. When a grafting reaction is performed in a general solvent, a cellulose derivative, the solubility of which has been changed by previously binding a carboxylic acid or an alcohol to a part of hydroxy groups of cellulose to reduce intermolecular force, can be used. Acylated cellulose, in which the hydrogen atom of a hydroxy group is substituted with an acyl group such as an acetyl group, a propionyl group and a butyryl group, is preferable. In particular, cellulose acetate, which is a cellulose acetylated by acetic acid or acetyl chloride, is preferable. Acetic acid, propionic acid, butyric acid and an acid halide and acid anhydride thereof are included in the aforementioned reactive hydrocarbon compounds; however, like this example, whole or part of predetermined reactive hydrocarbon compounds can be added (grafted) to a hydroxy group of cellulose before grafting with a cardanol component.

The remaining hydroxy group that is not used in grafting a cardanol component is a hydroxy group without being modified, a hydroxy group to be modified by acetylation, or a hydroxy group to which a reactive hydrocarbon compound is added (grafted). As the amount of hydroxy group increases, maximum strength and heat resistance tend to increase; whereas water absorbability tends to increase. As the conversion rate (degree of substitution) of hydroxy groups increases, water absorbability tends to decrease, plasticity and breaking strain tend to increase; whereas, maximum strength and heat resistance tend to decrease. In consideration of these tendencies and grafting conditions, the conversion rate of hydroxy groups can be appropriately set.

In view of ensuring sufficient water resistance, the number (average value) of remaining hydroxy groups of a cellulose resin grafted per glucose unit (hydroxy group remaining degree, $DS_{OH}$) is preferably 0.9 or less and more preferably 0.7 or less.

In view of water absorbability, mechanical strength and heat resistance, it is preferred that the hydroxy groups of cellulose are partly acylated with a reactive hydrocarbon as mentioned above. Furthermore, in view of the aforementioned grafting treatment of a cardanol component, it is preferred that hydroxy groups of cellulose are appropriately acylated (particularly, acetylated) before grafting of a cardanol component. The number of acyl groups (average value) to be added per glucose unit of cellulose (or a derivative thereof), in other words, the number of hydroxy groups acylated (degree of substitution of the hydroxy group, $DS_{AC}$) (average value) is preferably 0.5 or more in view of obtaining sufficient acylation effect, more preferably 1.0 or more, and further preferably 1.5 or more. Furthermore, in view of ensuring the sufficient grafting rate ($DS_{CD}$) of a cardanol component, the degree of substitution of the hydroxy group, $DS_{AC}$ by acylation is preferably 2.7 or less, more preferably 2.5 or less and further preferably 2.2 or less. The acyl group to be added by acylation is preferably at least one acyl group selected from an acetyl group, a propionyl group and a butyryl group. Note that the degree of acetylation is represented by $DS_{Ace}$, the degree of propionation is represented by $DS_{Pr}$, and the degree of butylation is represented by $DS_{Bu}$.

In the cellulose resin used in the exemplary embodiment, in view of ensuring a sufficient plant utilization ratio, the mass ratio (plant component ratio) of the sum of a cellulose component and a cardanol component relative to the total cellulose resin grafted is preferably 50% or more, and more preferably 60% or more. The cellulose component herein corresponds to the structure represented by Formula (1) where hydroxy groups are not acylated or grafted, whereas the cardanol component corresponds to the structure represented by Formula (2). On the assumption of these, calculation is made to obtain the mass ratio.

[Cardanol-modified Silicone Compound]

Next, a cardanol-modified silicone compound contained in the cellulose resin composition of the embodiment, as an impact resistance improving component will be described in more detail.

The cardanol-modified silicone compound of the embodiment is produced by binding cardanol or a derivative thereof (cardanol component) to a silicone compound. As the silicone compound, a modified silicone (modified polysiloxane) having a functional group for use in binding to a cardanol component can be used. The cardanol component can be bound to the silicone compound by use of a functional group of the modified silicone and the phenolic hydroxy group of a cardanol component.

As the modified silicone, at least one type of modified silicone selected from an epoxy-modified silicone having an epoxy group, an amino-modified silicone having an amino group, a hydroxy-modified silicone having a hydroxy group and a carboxyl-modified silicone having a carboxyl group is preferred. As the hydroxy-modified silicone, a carbinol-modified silicone having a carbinol group is preferred.

As the epoxy-modified silicone, an epoxy-modified silicone having an epoxy group-containing group introduced into an end or/and a side chain of a polysiloxane can be used. As the amino-modified silicone, an amino-modified silicone having an amino group-containing group introduced into an end or/and a side chain of a polysiloxane can be used. As the hydroxy-modified silicone, a hydroxy-modified silicone having a hydroxy group-containing group introduced into an end or/and a side chain of a polysiloxane can be used. As the carboxyl-modified silicone, a carboxyl-modified silicone having a carboxyl group-containing group introduced into an end or/and a side chain of a polysiloxane can be used.

Since the cardanol-modified silicone compound has a cardanol molecule structure, it has excellent affinity for a cellulose resin having a similar cardanol molecule structure and has a high compatibility. Therefore, in the cellulose resin composition containing them, the cardanol-modified silicone compound can be suppressed from bleeding out and also has excellent dispersibility. Furthermore, owing the silicone molecular structure of the cardanol-modified silicone compound, the impact resistance of a cellulose resin composition can be improved.

The content of the cardanol-modified silicone compound contained in the cellulose resin composition of the embodiment is preferably 1% by mass or more, and more preferably 2% by mass or more, based on the total amount of the cellulose resin and the cardanol-modified silicone compound in view of obtaining a sufficient addition effect. In view of sufficiently obtaining properties of the cellulose resin composition such as strength and suppressing bleed out, the content of the cardanol-modified silicone compound is preferably 20% by mass or less, and more preferably 10% by mass or less. In the cellulose resin composition thus obtained, a cardanol-modified silicone compound can be dispersed in the resin composition with an appropriate particle diameter (for example, 0.1 to 100 μm) and can improve the impact resistance of the resin composition.

The modified silicone (modified polysiloxane) to be used in formation of the cardanol-modified silicone compound of the embodiment is preferably a modified polydimethyl siloxane which has a main chain constituted of dimethyl siloxane repeat units, and a side chain or terminal methyl group partly substituted with a group containing a functional group (for example, organic substituent) capable of reacting with a cardanol component. The functional group is preferably any one of an amino group, an epoxy group, a hydroxy group and a carboxyl group. By the presence of such a functional group in modified silicone, it is easy to produce the aforementioned cardanol-modified silicone compound. As such a modified silicone, a modified silicone produced in accordance with a conventional method or a commercially available product can be used.

Examples of the functional group contained in the modified silicone include the organic substituents represented by the following formulas (3) to (11):

[Formula 3]

$$—R_1—NH_2 \quad (3)$$

$$—R_2—\overset{H}{N}—R_3—NH_2 \quad (4)$$

[Formula 4]

$$—R_4—\underset{O}{\overset{H}{\underset{\diagdown\diagup}{C}}}—CH_2 \quad (5)$$

$$—R_5—O\diagdown\!\!\triangle \quad (6)$$

$$—R_6—\text{(cyclohexane-epoxide)} \quad (7)$$

[Formula 5]

$$—R_7—OH \quad (8)$$

$$—R_8—\underset{R_{10}-OH}{\overset{R_9-OH}{\underset{|}{\overset{|}{C}}}}—R_{11} \quad (9)$$

$$—R_{12}—\text{(phenol-OH)} \quad (10)$$

[Formula 6]

$$—R_{13}COOH \quad (11)$$

In the aforementioned formulas, $R_1$ to $R_{10}$, $R_{12}$ and $R_{13}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —($CH_2$—$CH_2$—O)$_c$— (c represents an integer from 1 to 50), and —[$CH_2$—$CH(CH_3)$—O]$_d$— (d represents an integer from 1 to 50); and —($CH_2$)$_e$—NHCO— (e represents an integer from 1 to 8). Of these, an alkylene group is preferable and particularly, an ethylene group and a propylene group are preferable.

In the aforementioned formulas, $R_{11}$ represents an alkyl group having 1 to 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The number average molecular weight (g/mol) of the modified silicone to be used for formation of the cardanol-modified silicone compound of the embodiment is preferably 900 or more, more preferably 2000 or more, and further preferably 3000 or more and also preferably 100000 or less, and more preferably 50000 or less. The cardanol-modified silicone compound formed using modified silicone having an excessively small molecular weight tends to disappear by vaporization during a melt-kneading process for producing a cellulose resin composition, and an impact resistance improvement effect decreases. Furthermore, a cardanol-modified silicone compound formed using a modified silicone having an excessively large molecular weight is insufficient in compatibility with a cellulose resin. Note that as the number average molecular weight, a measurement value (corrected by a polystyrene standard sample) determined by GPC analysis using a 0.1% chloroform solution of a sample can be employed.

Such modified silicone is commercially easily available. For example, the following commercially available products are mentioned.

Commercially available products of the amino-modified silicone are as follows.

Examples of branched amino-modified silicones include commercially available products: KF-868, KF-865, KF-864, KF-859, KF-393, KF-860, KF-880, KF-8004, KF-8002, KF-8005, KF-867, X-22-3820W, KF-869 and KF-861 manufactured by Shin-Etsu Chemical Co., Ltd.; commercially available products: FZ3707, FZ3504, BY16-205, FZ3760, FZ3705, BY16-209, FZ3710, SF8417, BY16-849, BY16-850, BY16-879B, BY16-892, FZ3501, FZ3785, BY16-872, BY16-213, BY16-203, BY16-898 and BY16-890 manufactured by Dow Corning Toray Co. Ltd.; and commercially available products: TSF4702, TSF4703, TSF4704, TSF4705 and TSF4706 manufactured by Momentive Performance Materials Inc.

Examples of both-end amino-modified silicone include commercially available products PAM-E, KF-8010, X-22-161A, X-22-161B, KF-8012, KF-8008 and X-22-1660B-3 manufactured by Shin-Etsu Chemical Co., Ltd.; and commercially available products: BY16-871, BY16-853C and BY16-853U manufactured by Dow Corning Toray Co. Ltd.

Examples of one-end amino-modified silicone include commercially available products TSF4700 and TSF4701 manufactured by Momentive Performance Materials Inc.

Examples of branched both-end amino-modified silicone (side-chain: amino, both ends: methoxy) include commercially available products: KF-857, KF-8001, KF-862, X-22-9192 and KF-858 manufactured by Shin-Etsu Chemical Co., Ltd.

Commercially available products of the epoxy-modified silicone are as follows.

Examples of branched epoxy-modified silicone include commercially available products: X-22-343, KF-101, KF-1001, X-22-2000, X-22-2046, KF-102, X-22-4741, KF-1002 and X-22-3000T manufactured by Shin-Etsu Chemical Co., Ltd.

Examples of both-end epoxy-modified silicone include commercially available products: X-22-163, KF-105, X-22-163A, X-22-163C, X-22169AS and X-22-169B manufactured by Shin-Etsu Chemical Co., Ltd.

Examples of one-end epoxy-modified silicone include a commercially available product: X-22-173DX manufactured by Shin-Etsu Chemical Co., Ltd.

Examples of branched both-end epoxy-modified silicone include a commercially available product: X-22-9002 manufactured by Shin-Etsu Chemical Co., Ltd.

Commercially available products of the carbinol-modified silicone are as follows.

Examples of a branched carbinol-modified silicone include commercially available products: X-22-4039 and X-22-4015 manufactured by Shin-Etsu Chemical Co., Ltd.

Examples of both-end carbinol-modified silicone include commercially available products: X-22-160AS, KF-6001, KF-6002 and KF-6003 manufactured by Shin-Etsu Chemical Co., Ltd.

Examples of one-end carbinol-modified silicone include commercially available products: X-22-170BX and X-22-170DX manufactured by Shin-Etsu Chemical Co., Ltd.

Commercially available products of the carboxyl-modified silicone are as follows.

Examples of a branched carboxyl-modified silicone include a commercially available product: X-22-3701E manufactured by Shin-Etsu Chemical Co., Ltd.

Examples of both-end carboxyl-modified silicone include a commercially available product: X-22-162 manufactured by Shin-Etsu Chemical Co., Ltd.

Examples of one-end carboxyl-modified silicone include a commercially available product: X-22-3710 manufactured by Shin-Etsu Chemical Co., Ltd.

The cardanol-modified silicone compound of the embodiment can be formed as follows.

The binding between a cardanol component and a modified silicone can be made by the chemical reaction between the phenolic hydroxy group of the cardanol component and a functional group of the modified silicone. At this time, a catalyst for facilitating the reaction can be added.

Furthermore, the binding between a cardanol component and a modified silicone can be made by use of a multifunctional compound capable of reacting with both the cardanol component and the modified silicone. The multifunctional compound has a first functional group capable of reacting with the phenolic hydroxy group of the cardanol component and a second functional group capable of reacting with a functional group of the modified silicone. In this case, the polysiloxane silicon atom to which the functional group-containing group of the modified silicone is bound and the cardanol carbon atom to which the phenolic hydroxy group of the cardanol component is bound are linked via an organic linking group. The organic linking group may contain a first bond selected from an amide bond, an ester bond, an ether bond and a urethane bond on the side of the polysiloxane silicon atom and a second bond selected from an ester bond, an ether bond and a urethane bond on the side of the cardanol carbon atom. The second bond can be bound to the cardanol carbon atom.

For example, a multifunctional compound is bound to a cardanol component by use of the phenolic hydroxy group of the cardanol component and a functional group of the multifunctional compound to obtain a cardanol derivative. The obtained cardanol derivative can be bound to a modified silicone by use of a functional group of the modified silicone and the functional group of the cardanol derivative (the group derived from the multifunctional compound). As the cardanol, hydrogenated cardanol may be used.

The multifunctional compound and organic linking group mentioned above preferably contain a hydrocarbon group. The number of carbon atoms of the hydrocarbon group is preferably 1 or more, more preferably 2 or more, and also preferably 20 or less, more preferably 14 or less and further preferably 8 or less. If the number of carbon atoms is excessively large, the size of the molecule becomes excessively large, with the result that reactivity may decrease. As such a hydrocarbon group, a divalent group is preferable. Examples thereof include divalent linear aliphatic hydrocarbon groups (particularly linear alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as a cycloheptane ring, a cyclohexane ring, a cyclooctane ring, a bicyclopentane ring, a tricyclohexane ring, a bicyclooctane ring, a bicyclononane ring and a tricyclodecane ring; divalent aromatic hydrocarbon groups such as a benzene ring, a naphthalene ring and a biphenylene group; and divalent groups obtained by combining these.

As the functional group of the multifunctional compound, a group selected from a carboxyl group, a carboxylic anhydride group, a carboxylic halide group (particularly a carboxylic chloride group), an epoxy group, an isocyanate group and a halogen group is preferable. Of them, a carboxyl group, a carboxylic anhydride group, a halogen group (particularly a chloride group) and an isocyanate group are preferable. As the functional group to be reacted with a phenolic hydroxy group of cardanol, particularly, a carboxylic anhydride group, a halogen group (particularly a chloride group) and an isocyanate group are preferable. As the functional group to be reacted with a functional group of modified silicone, particularly, a carboxyl group, a carboxylic halide group (particularly, a carboxylic chloride group) and an isocyanate group are preferable. The carboxylic halide group can be formed by forming an acid halide of a carboxyl group before binding.

Specific examples of such a multifunctional compound include dicarboxylic acids, carboxylic anhydrides, dicarboxylic halides, monochlorocarboxylic acids and diisocyanates. Examples of the dicarboxylic acids include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic anhydrides include anhydrides of these dicarboxylic acids. Examples of the dicarboxylic halides include acid halides of these dicarboxylic acids. Examples of the monochlorocarboxylic acids include monochloroacetic acid, 3-chloropropionic acid, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanatemethyloctane, lysine ester triisocyanate, 1,3,6-hexamethylene triisocyanate, bicycloheptane triisocyanate and dicyclohexylmethane diisocyanate (HMDI: hydrogenated MDI). Of these, tolylene diisocyanate (TDI), 4,4'-diphenylmethane diisocyanate (MDI) and 1,6-hexamethylene diisocyanate (HDI) can be preferably used.

For example, in the case where a carboxyl modified hydrogenated cardanol prepared by adding a multifunctional compound having a carboxyl group to hydrogenated cardanol is used as the cardanol derivative, and a one-end epoxy-modified silicone is used as the modified silicone and reacted, the carboxyl group of the carboxyl modified hydrogenated cardanol binds to the epoxy group of the one-end epoxy-modified silicone. This reaction can be performed by adding carboxyl modified hydrogenated cardanol (1.0 to 2.0 equivalents) to the one-end epoxy-modified silicone heated to 100° C. to 150° C. The reaction can be sufficiently performed in reaction time of, for example, about 1 to 3 hours. By this reaction, almost all supply amount of cardanol derivative can be bound to the modified silicone.

In reacting the cardanol derivative and the modified silicone, a solvent is not particularly required; however, an organic solvent such as chloroform, toluene and dioxane may be used as the solvent. Furthermore, to facilitate the rate of the reaction, a catalyst may be used.

The resultant product obtained after completion of the reaction is a mixture containing a cardanol-modified silicone compound as a main component and other components such as an unreacted cardanol derivative and unreacted modified silicone. The components contained in the mixture can be purified and isolated by a conventional method such as a method of using difference in solubility and column chromatographic method. When the amount of unreacted components is low, individual components are not necessarily isolated and the mixture can be directly used.

The cardanol-modified silicone compound having an appropriate particle diameter (for example, 0.1 μm or more and 100 μm or less) is desirably dispersed in a matrix, i.e., a cardanol-added cellulose resin, during a process for producing a cellulose resin composition. If a cardanol-modified silicone compound having an appropriate particle diameter is dispersed in a cardanol-added cellulose resin, stress concentration on the periphery of a silicone region having a low elastic modulus effectively occurs. As a result, a resin molded product having excellent impact resistance can be obtained.

The addition amount of cardanol component to modified silicone is preferably at least one equivalent. In the case where the reaction rate between a cardanol component and a modified silicone is 90% or more, almost the same amount of the cardanol component as the supplied amount can be bound to the modified silicone. The average content of the cardanol component of the cardanol-modified silicone compound is preferably 0.5% by mass to 20% by mass, and more preferably 1.5% by mass to 15% by mass. If the sufficient amount of the cardanol component is not bound to the modified silicone, the affinity for a cardanol-added cellulose resin decreases and it becomes difficult to make dispersion in the cardanol-added cellulose resin with an appropriate particle diameter. As a result, a suppression effect of bleed out decreases and an effect of improving impact resistance decreases.

[Other Components]

To the cellulose resin composition in accordance with the embodiment described above, various types of additives conventionally used for thermoplastic resins can be used. For example, if a plasticizer is added, thermoplasticity and breaking elongation can be further improved. Examples of such a plasticizer include phthalic acid esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyvalent alcohol esters such as triacetin, diacetyl glycerin, tripropionitrile glycerin and glycerin monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyl triethyl citrate and acetyl tributyl citrate; epoxylated vegetable oils such as epoxylated soybean oil and epoxylated linseed oil; castor oil and a derivative thereof; benzoic acid esters such as ethyl O-benzoylbenzoate; aliphatic dicarboxylic acid esters such as sebacic acid ester and azelaic acid ester; unsaturated dicarboxylic acid esters such as maleic acid ester; and others such as N-ethyl toluene sulfonamide, triacetin, O-cresyl p-toluenesulfonate and tripropionin.

Examples of the other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

A reactive functional group (a carboxylic acid group, a group derived from a carboxylic acid group, other functional groups) in such a plasticizer can be reacted with a phenolic hydroxy group or an unsaturated bond of cardanol to obtain a plasticizer with cardanol added thereto. Such a plasticizer can be used. If such a plasticizer is used, compatibility of the cellulose resin of the embodiment and the plasticizer can be improved and thus the addition effect of the plasticizer can be further improved.

To the cellulose resin composition of the embodiment, if necessary, an inorganic or organic granular or a fibrous filler can be added. If the filler is added, strength and rigidity can be further improved. Examples of the filler include mineral-substance particles (e.g., talc, mica, baked diatom earth, kaolin, sericite, bentonite, smectite, clay, silica, quartz powder, glass beads, glass powder, glass flake, milled fiber, wollastonite), boron-containing compounds (e.g., boron nitride, boron carbide, titanium borate), metal carbonates (e.g., magnesium carbonate, heavy calcium carbonate, light calcium carbonate), metal silicates (e.g., calcium silicate, aluminum silicate, magnesium silicate, magnesium aluminosilicate), metal oxides (e.g., magnesium oxide), metal hydroxides (e.g., aluminum hydroxide, calcium hydroxide, magnesium hydroxide), metal sulfates (e.g., calcium sulfate, barium sulfate), metal carbides (e.g., silicon carbide, aluminum carbide, titanium carbide), metal nitrides (e.g., aluminum nitride, silicon nitride, titanium nitride), white carbon and metal foils. Examples of fibrous fillers include organic fibers (e.g., natural fiber, paper), inorganic fibers (e.g., glass fiber, asbestos fiber, carbon fiber, silica fiber, silica alumina fiber, wollastonite, zirconia fiber, and potassium titanate fiber) and metal fibers. These fillers can be used alone or in combination two or more types.

To the cellulose resin composition of the embodiment, if necessary, a flame retardant can be added. If the flame retardant is added, flame retardancy can be imparted. Examples of the flame retardant include magnesium hydroxide, aluminum hydroxide, metal hydrates such as hydrotalcite, basic magnesium carbonate, calcium carbonate, silica, alumina, talc, clay, zeolite, bromine flame retardant, antimony trioxide, a phosphoric flame retardant (e.g., an aromatic phosphoric acid ester and aromatic condensed phosphoric acid ester) and a compound containing phosphorus and nitrogen (phosphazene compound). These flame retardants can be used alone or in combination of two or more types.

Furthermore, as the flame retardant, a reaction product of phosphorus oxide, phosphoric acid or a derivative of these and cardanol, and a polymer of the reaction product can be used. If such a flame retardant is used, the interaction between a cellulose resin of the embodiment and a flame retardant is reinforced and an excellent flame retardancy effect can be obtained. Examples of such a flame retardant include a reaction product obtained by reacting phosphorus oxide ($P_2O_5$) or phosphoric acid ($H_3PO_4$) with the phenolic hydroxy group of cardanol, and a polymer obtained by adding hexamethylene tetramine to the reaction product, followed by polymerizing.

To the cellulose resin composition of the embodiment, if necessary, an impact resistance improver can be added. If the impact resistance improver is added, impact resistance can be improved. Examples of the impact resistance improver include a rubber component and a silicone compound. Examples of the rubber component include natural rubber, epoxylated natural rubber and synthetic rubber. Examples of the silicone compound include organic polysiloxanes formed by polymerization of e.g., alkyl siloxane and alkylphenyl siloxane, and modified silicone compounds obtained by modifying a side chain or an end of each of the organic polysiloxanes by polyether, methylstyryl, an alkyl, a higher fatty acid ester, an alkoxy, fluorine, an amino group, an epoxy group, a carboxyl group, a carbinol group, a methacryl group, a mercapto group and a phenol group. These impact resistance improvers can be used alone or in combination of two or more.

As the impact resistance improver, a cardanol polymer containing cardanol as a main component may be used. Such an impact resistance improver has excellent compatibility with a cellulose resin in accordance with the exemplary embodiment and therefore a higher impact resistance improving effect can be obtained. Specific examples thereof include a cardanol polymer obtained by adding formaldehyde to cardanol and reacting this mixture with an unsaturated bond in the straight-chain hydrocarbon of the cardanol; and a cardanol polymer obtained by adding a catalyst such as sulfuric acid, phosphoric acid or diethoxytrifluoroboron to cardanol and reacting unsaturated bonds of the straight-chain hydrocarbon of the cardanol with each other.

To the cellulose resin composition of the exemplary embodiment, if necessary, additives such as a colorant, an antioxidant and a heat stabilizer may be added as long as they are applied to conventional resin compositions.

To the cellulose resin composition of the exemplary embodiment, if necessary, a general thermoplastic resin may be added.

Particularly, by adding a thermoplastic resin having excellent flexibility such as a thermoplastic polyurethane elastomer (TPU), impact resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment. In view of ensuring the properties of the cellulose resin such as strength and suppressing bleed out, the addition amount of thermoplastic resin is preferably 20% by mass or less and more preferably 15% by mass or less.

The thermoplastic polyurethane elastomer (TPU) suitable for improving impact resistance that can be used includes a polyurethane elastomer prepared using a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

As examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol, glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent impact resistance can be obtained.

These thermoplastic polyurethane elastomers (TPU) may be used singly or in combination.

A method for producing a cellulose resin composition of the exemplary embodiment is not particularly limited. For example, the cellulose resin composition can be produced by melting and mixing a cellulose resin and a cardanol-modified silicone compound and another additional component as necessary manually by handmixing or by use of a known mixer such as a tumbler mixer, a ribbon blender, a single-axial or a multiaxial mixing extruder, and a compounding apparatus such as a kneader and kneading roll and, if necessary, granulating the mixture into an appropriate shape. In another preferable process, additives and a resin are dispersed in solvent such as an organic solvent and are mixed and furthermore, if necessary, a coagulation solvent is added to obtain a mixed composition of the additives and the resin and thereafter, the solvent is evaporated.

The cellulose resin composition in accordance with the exemplary embodiments mentioned above can be used as a molding material. The molding material formed of the cellulose resin composition is suitable for forming housing such as packaging for an electronic device.

As described above, the cellulose resin composition of the embodiment contains a cardanol-added cellulose resin as a base resin and a cardanol-modified silicone compound as an impact resistance improving component. The base resin herein refers to a main component of the composition and means that other components may be contained as long as they do not prevent the function of the main component. The content of the main component is not particularly limited; however, the content of the main component in the composition is preferably 50% by mass or more, more preferably 70% by mass or more, further preferably 80% by mass or more, and particularly preferably 90% by mass or more.

EXAMPLES

The present invention will be more specifically described by way of examples below.

In accordance with the following Synthesis Examples, a cardanol-modified silicone compound (C) and a cardanol-added cellulose resin (D) were prepared.

First, in accordance with the following Synthesis Examples 1 to 4, cardanol modified silicones (C-1) and (C-2) were prepared.

Synthesis Example 1

Preparation of Cardanol Derivative (Carboxylated Hydrogenated Cardanol) (A-1)

A hydrogenated cardanol (m-n-pentadecyl phenol manufactured by ACROS Organics) in which an unsaturated bond of the straight-chain hydrocarbon moiety of cardanol is hydrogenated, was used as a raw material. A carboxyl group was added by reacting the phenolic hydroxy group with monochloroacetic acid to obtain carboxylated hydrogenated cardanol. More specifically, carboxylated hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, at room temperature, a solution of monochloro acetic acid (66 g (0.70 mol)) manufactured by Kanto Chemical Co., Inc. dissolved in methanol (50 mL) was added dropwise. After completion of the dropwise addition, the reaction solution was continuously stirred while being refluxed at 73° C. for 4 hours, and then cooled to room temperature. Thereafter, the reaction mixture was acidified with diluted hydrochloric acid up to pH=1. To this, methanol (250 mL), diethyl ether (500 mL) and further, distilled water (200 mL), were added. The water layer was separated by a separation funnel and discarded. The ether layer was washed twice with distilled water (400 mL). To the ether layer, anhydrous magnesium was added to dry the ether layer, which was separated by filtration. The filtrate (ether layer) was concentrated by an evaporator (90° C./3 mmHg) under reduced pressure. As the residue, a yellow brown powdery crude product was obtained. The crude product was recrystallized from n-hexane and dried under vacuum to obtain carboxylated hydrogenated cardanol as white powder (46 g (0.12 mol)).

Synthesis Example 2

Preparation of Chlorinated Hydrogenated Cardanol (A-2)

The carboxyl group of carboxylated hydrogenated cardanol (A-1) obtained in Synthesis Example 1 was converted into an acid chloride group by chlorinating it with oxalyl chloride to obtain chlorinated hydrogenated cardanol. More specifically, chlorinated hydrogenated cardanol was prepared in accordance with the following procedure.

First, carboxylated hydrogenated cardanol (A-1) of Synthesis Example 1 (46 g (0.12 mol)) was dissolved in dehydrated chloroform (250 mL). To this, oxalyl chloride (24 g (0.19 mol)) and N,N-dimethylformamide (0.25 mL (3.2 mmol)) were added and stirred at room temperature for 72 hours. Chloroform, excessive oxalyl chloride and N,N-dimethylformamide were distillated away under reduced pressure to obtain chlorinated hydrogenated cardanol (48 g (0.13 mol)).

Synthesis Example 3

Preparation of Cardanol-Modified Silicone Compound (C-1)

Carboxylated hydrogenated cardanol (A-1) of Synthesis Example 1 was allowed to bind with epoxy-modified silicone (B-1) (trade name: X-22-173DX, manufactured by Shin-Etsu Chemical Co., Ltd., functional group equivalent: 4500 g/mol, number average molecular weight: 4500 g/mol) to obtain cardanol-modified silicone compound (C-1). More specifically, the cardanol-modified silicone compound was prepared in accordance with the following procedure.

To a reaction container purged with nitrogen, epoxy-modified silicone (B-1) (20 g (0.0044 mol)) was placed and carboxylated hydrogenated cardanol (A-1) (3.2 g (0.0088 mol)) of Synthesis Example 1 was added. The reaction mixture was stirred at 150° C. for 3 hours and cooled to room temperature to obtain a reaction product (20.3 g).

The obtained sample (cardanol-modified silicone compound (C-1)) was measured by $^1$H-NMR (product name: AV-400, manufactured by Bruker Co. Ltd., 400 MHz). As a result, the content of a reaction product between carboxylated hydrogenated cardanol (A-1) and epoxy-modified silicone (B-1) in a molar ratio of 2:1 was 90% by mass or more.

Synthesis Example 4

Preparation of Cardanol-Modified Silicone Compound (C-2)

Chlorinated hydrogenated cardanol (A-2) of Synthesis Example 2 was allowed to bind to diamino-modified silicone (B-2) (trade name: KF-8005 manufactured by Shin-Etsu Chemical Co., Ltd., functional group equivalent: 11000 g/mol, number average molecular weight: 25000 g/mol) to obtain cardanol-modified silicone compound (C-2). More specifically, the cardanol-modified silicone compound was prepared in accordance with the following procedure.

In a reaction container purged with nitrogen, diamino-modified silicone (B-2) (20 g (0.0008 mol)) was dissolved in dehydrated chloroform (100 ml). To this, triethylamine (0.11 mL (0.0008 mol)) were added as a reaction catalyst and an acid trapping agent. To the solution, chlorinated hydrogenated cardanol (A-2) (0.69 g (0.0018 mol)) dissolved in dehydrated chloroform (50 ml) was added. After the reaction mixture was stirred at room temperature overnight, distilled water (200 mL) was added. The water layer was separated by a separation funnel and discarded. The chloroform layer was washed twice with distilled water (200 mL). To the chloroform layer, anhydrous magnesium was added to dry the chloroform layer, which was separated by filtration. The filtrate (chloroform layer) was concentrated by an evaporator (90° C./3 mmHg) under reduced pressure. As the residue, an oily reaction product (15 g) was obtained.

The obtained sample (cardanol-modified silicone compound (C-2)) was measured by $^1$H-NMR (Product name: AV-400, manufactured by Bruker Co. Ltd., 400 MHz). As a result, the content of a reaction product between chlorinated hydrogenated cardanol (A-2) and diamino-modified silicone (B-2) in a molar ratio of 2:1 was 90% by weight or more.

Next, cardanol-added cellulose resin (D) was prepared in accordance with Synthesis Example 5.

Synthesis Example 5

Preparation of Cardanol-Added Cellulose Resin (D)

Chlorinated hydrogenated cardanol (A-2) of Synthesis Example 2, and benzoyl chloride (BC) serving as a reactive hydrocarbon were allowed to bind to cellulose acetate (trade name: LM-80, manufactured by Daicel Chemical Industries, Ltd., the addition number of acetic acid molecules per glucose unit of cellulose (acetyl substitution rate: $DS_{Ace}$)=2.1) to obtain grafted cellulose acetate. More specifically, the grafted cellulose acetate was prepared in accordance with the following procedure.

Cellulose acetate (10 g (the amount of hydroxy group: 0.036 mol)) was dissolved in dehydrated dioxane (200 mL). To this, triethyl amine (5.0 mL (0.036 mol)) serving as a reaction catalyst and an acid trapping agent was added. To the solution, a dioxane solution (100 mL) in which chlorinated hydrogenated cardanol (A-2) (4.1 g (0.011 mol)) of Synthesis Example 2 and benzoyl chloride (BC) (2.8 g (0.020 mol)) manufactured by Tokyo Chemical Industry Co., Ltd. was dissolved, was added. The reaction solution was heated to reflux at 100° C. for 5 hours and gently added dropwise to methanol (3 L) while stirring. A solid substance reprecipitated was separated by filtration. The solid substance separated by filtration was dried overnight in the air and further dried at 105° C. for 5 hours under vacuum to obtain grafted cellulose acetate (13 g).

The obtained sample (grafted cellulose acetate) was measured by $^1$H-NMR (product name: AV-400, manufactured by Bruker Co. Ltd., 400 MHz). As a result, $DS_{CD}$ was 0.30 and $DS_{BC}$ was 0.14.

Examples 1 and 2, Comparative Examples 1 to 3

To cellulose resin (D) of Synthesis Example 5, the modified silicones shown in Table 1 were added in accordance with the blending conditions shown in Table 1. The mixture was stirred (temperature: 200° C., screw rotation rate: 50 rpm) by a mixing extruder (HAAKE MiniLab Rheomex extruder, Model CTW5, Thermo Electron Corp., Waltham, Mass.) to prepare a cellulose resin composition. Note that Comparative Example 1 corresponds to Reference Example 7 described later.

The obtained cellulose resin composition was press-molded in the following conditions to obtain a molded product.

(Molding Conditions)

Temperature: 200° C., Time: 2 minutes, pressure: 100 kgf ($9.8 \times 10^2$N),

Size of molded product (molding 1): Thickness: 2 mm, Width: 13 mm, Length: 80 mm, Size of molded product (molding 2): Thickness: 4 mm, Width: 10 mm, Length: 80 mm.

The obtained molded products were evaluated in accordance with the following procedure.

The results are shown in Table 1.

[Evaluation of Izod Impact Strength]

Molding 2 obtained by the molding process above was subjected to measurement of notch-added Izod impact strength in accordance with JIS K7110.

[Bending Test]

Molding 1 obtained by the molding process above was subjected to a bending test in accordance with JIS K7171.

[Measurement of Glass Transition Temperature (Heat Resistance Evaluation)]

Glass transition temperature was measured by DSC (product name: DSC 6200, manufactured by Seiko Instruments Inc.).

[Determination of Water Absorption Rate]

The water absorption rate was determined in accordance with JIS K7209. Specifically, the weight increase rate of molding 1 was determined when it was soaked in pure water of normal temperature for 24 hours.

[Evaluation of Bleed Out]

The obtained cellulose resin composition was molded in the above molding conditions. At this time, the surface state of the molded product was visually observed and evaluated in accordance with the following criteria.

◯: Bleed out is observed only in less than 10% of the surface area of a molded product, Δ: Bleed out is observed in 10% or more and less than 50% of the surface area of a molded product, x: Bleed out is observed in 50% or more of the surface area of a molded product, xx: Bleed out significantly occurs and the molded product becomes nonuniform.

[Table 1]

TABLE 1

|  |  | Example 1 | Example 2 | Comparative Example 1 | Comparative Example 2 | Comparative Example 3 |
| --- | --- | --- | --- | --- | --- | --- |
| Composition Content [% by mass] | Cellulose resin (D) | 97 | 97 | 100 | 97 | 97 |

TABLE 1-continued

|  |  | Example 1 | Example 2 | Comparative Example 1 | Comparative Example 2 | Comparative Example 3 |
|---|---|---|---|---|---|---|
|  | Modified silicone | C-1 | C-2 | — | B-1 | B-2 |
|  | Content [% by mass] | 3 | 3 | — | 3 | 3 |
| Evaluation results | Impact strength [KJ/m$^2$] | 8.5 | 12.6 | 4.4 | Unable to evaluate | 6.2 |
|  | Bending strength [MPa] | 114 | 115 | 113 |  | 114 |
|  | Bending elasticity [GPa] | 2.4 | 2.4 | 2.2 |  | 2.4 |
|  | Bend-breaking strain [%] | >10 | >10 | >10 |  | >10 |
|  | Glass transition temperature (heat resistance) [° C.] | 155 | 155 | 154 |  | 155 |
|  | Water absorption rate [%] | 1.3 | 1.2 | 1.3 |  | 1.3 |
|  | Bleed out | ○ | ○ | ○ | xx | x |

If Examples 1 and 2 are compared to Comparative Example 1, it is found that a resin composition prepared by adding cardanol-modified silicone compound (C-1) or (C-2) to cellulose resin (D) is improved in impact resistance while maintaining satisfactory strength, heat resistance (Tg) and water resistance. Furthermore, the impact resistance of the resin composition (cardanol-modified silicone compound (C-2) is added) of Example 2 is further improved compared to the resin composition of Example 1.

Furthermore, the resin compositions of Examples 1 and 2 each exhibit an equivalent and greater melting performance and good thermoplasticity under the same molding conditions compared to the cardanol-added cellulose resin of Comparative Example 1.

In contrast, the resin composition of Comparative Example 2 containing epoxy-modified silicone (B-1) not modified with cardanol exhibited significant bleed out and thus it was difficult to prepare a molded product. In addition, since the molded product is not uniform, evaluation was not made. The resin composition of Comparative Example 3 containing diamino-modified silicone (B-2) not modified with cardanol exhibited bleed out and had a low improvement effect of impact resistance.

A cardanol-added cellulose resin serving as a base resin of the cellulose resin composition of the embodiment will be described in more detail by way of specific examples, below.

Reference Synthesis Example 1

Cardanol Derivative 1 (Preparation of Chloridized and Succinic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. When the hydrogenated cardanol was measured by $^1$H-NMR (product name: AV-400, 400 MHz, manufactured by Bruker), no unsaturated bond was detected. Thus, it was confirmed that a hydrogenation rate is at least 90% by mole or more. The phenolic hydroxy group of the cardanol was reacted with succinic anhydride to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, succinic anhydride (33 g (0.33 mol)) was dissolved in dehydrated chloroform (250 mL). To this, dehydrated pyridine (5.0 mL (0.062 mol)) and a raw material, i.e., hydrogenated cardanol (50 g (0.16 mol)) were added. The reaction solution was heated to reflux under a nitrogen atmosphere at 70° C. for 24 hours, cooled to room temperature. Thereafter, a crystal of succinic anhydride precipitated was separated by filtration. The chloroform solution filtrated was washed twice with 0.1 mol/L hydrochloric acid (250 mL) and further washed twice with water (250 mL). After washing, the chloroform solution was dehydrated with magnesium sulfate and magnesium sulfate was separated by filtration and chloroform was distillated away under reduced pressure to obtain a brown solid substance of carboxylated and hydrogenated cardanol (60 g (0.15 mol)).

The resultant carboxylated and hydrogenated cardanol (50 g (0.12 mol)) was dissolved in dehydrated chloroform (250 mL). To this, oxalyl chloride (24 g (0.19 mol)) and N,N-dimethylformamide (0.25 mL (3.2 mmol)) were added. The reaction solution was stirred at room temperature for 72 hours. Chloroform, excessive oxalyl chloride and N,N-dimethylformamide were distillated away under reduced pressure to obtain chloridized and hydrogenated cardanol (52 g (0.12 mol)).

Reference Synthesis Example 2

Cardanol Derivative 2 (Preparation of Chloridized and Monochloroacetic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, at room temperature, a solution of monochloro acetic acid (66 g (0.70 mol)) (manufactured by Kanto Chemical Co., Inc.) dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The resultant carboxylated and hydrogenated cardanol (46 g (0.12 mol)) was dissolved in dehydrated chloroform (250 mL). To this, oxalyl chloride (24 g (0.19 mol)) and N,N-dimethylformamide (0.25 mL (3.2 mmol)) were added. The mixture was stirred at room temperature for 72 hours. Chloroform, excessive oxalyl chloride and N,N-dimethylformamide were distilled away under reduced pressure to obtain chloridized and hydrogenated cardanol (48 g (0.13 mol)).

Reference Synthesis Example 3

Preparation of Biphenylacetyl Chloride

Biphenylacetic acid (6.0 g (0.028 mol)) manufactured by Sigma-Aldrich Co. LLC was dissolved in dehydrated chloroform (60 ml). To this, oxalyl chloride (3.7 g (0.029 mol)) and N,N-dimethylformamide (0.04 ml (0.51 mmol)) were added. The mixture was stirred at room temperature for 72 hours. Chloroform, excessive oxalyl chloride and N,N-dimethylformamide were distilled away under reduced pressure to obtain biphenylacetyl chloride (6.5 g (0.028 mol)).

Reference Example 1

The chloridized and hydrogenated cardanol (cardanol derivative 1) prepared in Reference Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (46 g (0.11 mol)) prepared in Reference Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (20 g).

The obtained sample (grafted cellulose acetate) was measured by $^1$H-NMR (product name: AV-400, 400 MHz, manufactured by Bruker), and $DS_{CD}$ was 0.90.

Furthermore, the sample was evaluated in the following procedure. The results are shown in Table 101A.

[Evaluation of Thermoplasticity (Press Moldability)]

Press molding was performed in the following conditions to obtain a molded product. At that time, moldability was evaluated in accordance with the following criteria.

(Molding Conditions)

Temperature: 170° C., Time: 2 minutes, Pressure: 100 kgf ($9.8 \times 10^2$ N),

Size of molded product: Thickness: 2 mm, Width: 13 mm, Length: 80 mm.

(Evaluation Criteria)

○: Good, Δ: not good (void, sink mark or partial uncharged portion was observed), x: cannot be molded.

[Measurement of Glass Transition Temperature (Heat Resistance Evaluation)]

Glass transition temperature was measured by DSC (product name: DSC6200, manufactured by Seiko Instruments Inc.).

[Bending Test]

The molded product obtained by the aforementioned molding process was subjected to a bending test in accordance with JIS K7171.

[Tensile Test]

A solution of a sample (2 g) dissolved in chloroform (20 mL) was prepared. The solution was subjected to casting and a film of 10 mm in width, 60 mm in length and 0.2 mm in thickness was prepared by cutting out by a cutter knife. The film was subjected to a tensile test in accordance with JIS K7127.

[Measurement of Water Absorption Rate]

Water absorption rate was obtained by measurement in accordance with JIS K7209.

[Determination of Plant-Component Ratio]

A cellulose component and a cardanol component were regarded as plant components. The total content rate (% by mass) of the plant components relative to the whole sample was obtained. Assuming that the cellulose component herein corresponds to that having a structure represented by Formula (1) above in which a hydroxy group is not acylated or grafted, and that the cardanol component corresponds to that having a structure represented by Formula (2) above, calculation was made.

Reference Example 2

The chloridized and hydrogenated cardanol (cardanol derivative 1) prepared in Reference Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (23 g (0.054 mol)) prepared in Reference Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Reference Example 1. The results are shown in Table 101A.

Reference Example 3

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (14 g (0.037 mol)) prepared in Reference Synthesis Example 2 was added. The reaction solution was heated to reflux at 100° C. for 3 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Reference Example 1. The results are shown in Table 101A.

Reference Example 4

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of the chloridized and hydrogenated cardanol was changed to 21 g (0.054 mol) to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.80.

Furthermore, the sample was evaluated in the same manner as in Reference Example 1. The results are shown in Table 101A.

Reference Example 5

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of chloridized and hydrogenated cardanol was changed to 12 g (0.031 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.44.

Furthermore, the sample was evaluated in the same manner as in Reference Example 1. The results are shown in Table 101A.

Reference Example 6

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of the chloridized and hydrogenated cardanol was changed to 6.9 g (0.018 mol) to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30.

Furthermore, the sample was evaluated in the same manner as in Reference Example 1. The results are shown in Table 101A.

Reference Example 7

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.1 g (0.011 mol)) prepared in Reference Synthesis Example 2 and benzoyl chloride (BC) (2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.14.

Furthermore, the sample was evaluated in the same manner as in Reference Example 1. The results are shown in Table 101B.

Reference Example 8

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 3.1 g (0.008 mol) and the supply amount of benzoyl chloride was changed to 8.4 g (0.060 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.22 and $DS_{BC}$ was 0.27.

Furthermore, the sample was evaluated in the same manner as in Reference Example 1. The results are shown in Table 101B.

Reference Example 9

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of was made in accordance with the same content and manner as in Reference Example 7 except that the supply amount of the chloridized and hydrogenated cardanol was changed to 7.6 g (0.020 mol) and the supply amount of benzoyl chloride was changed to 8.4 g (0.060 mol) to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.44 and $DS_{BC}$ was 0.22.

Furthermore, the sample was evaluated in the same manner as in Reference Example 1. The results are shown in Table 101B.

Reference Example 10

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 4.1 g (0.011 mol) and the supply amount of benzoyl chloride was changed to 28.1 g (0.20 mol) to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.24 and $DS_{BC}$ was 0.42.

Furthermore, the sample was evaluated in the same manner as in Reference Example 1. The results are shown in Table 101B.

Reference Example 11

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 4.6 g (0.012 mol) and the supply amount of benzoyl chloride was changed to 1.1 g (0.008 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.07.

Furthermore, the sample was evaluated in the same manner as in Reference Example 1. The results are shown in Table 101B.

Reference Example 12

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 1.5 g (0.004 mol) and the supply amount of benzoyl chloride was changed to 2.2 g (0.016 mol) to obtain grafted cellulose acetate (12 g).

The obtained sample (grafted cellulose acetate) was measured by $^1$H-NMR (product name: AV-400, 400 MHz, manufactured by Bruker), and $DS_{CD}$ was 0.08 and $DS_{BC}$ was 0.16.

Furthermore, the sample was evaluated in the same manner as in Reference Example 1. The results are shown in Table 101B.

Reference Example 13

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (7.0 g (0.018 mol)) prepared in Reference Synthesis Example 2 and biphenylacetyl chloride (BAA) (1.5 g (0.0065 mol)) prepared in Reference Synthesis Example 3 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.27 and $DS_{BAA}$ was 0.15.

Furthermore, the sample was evaluated in the same manner as in Reference Example 1. The results are shown in Table 101B.

Reference Example 14

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 13 except that the supply amount of the chloridized and hydrogenated cardanol was changed to 12.2 g (0.032 mol) and the supply amount of biphenylacetyl chloride was changed to 4.6 g (0.020 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.40 and $DS_{BAA}$ was 0.40.

Furthermore, the sample was evaluated in the same manner as in Reference Example 1. The results are shown in Table 101B.

Reference Example 15

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 13 except that the supply amount of the chloridized and hydrogenated cardanol was changed to 15.2 g (0.040 mol) and the supply amount of biphenylacetyl chloride was changed to 3.2 g (0.014 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.55 and $DS_{BAA}$ was 0.28.

Furthermore, the sample was evaluated in the same manner as in Reference Example 1.

The results are shown in Table 101B.

Reference Example 16

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 13 except that the supply amount of the chloridized and hydrogenated cardanol was changed to 7.6 g (0.020 mol) and the supply amount of biphenylacetyl chloride was changed to 7.4 g (0.032 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BAA}$ was 0.52.

Furthermore, the sample was evaluated in the same manner as in Reference Example 1. The results are shown in Table 101B.

Reference Example 17

The chloridized and hydrogenated cardanol (cardanol derivative 2) prepared in Reference Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.0 g (0.011 mol)) prepared in Reference Synthesis Example 2 and phenylpropionyl chloride (PPA) (2.0 g (0.012 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.17 and $DS_{PPA}$ was 0.25.

Furthermore, the sample was evaluated in the same manner as in Reference Example 1. The results are shown in Table 101C.

Reference Example 18

The chloridized and hydrogenated cardanol (cardanol derivative 2) prepared in Reference Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 17 except that the supply amount of the chloridized and hydrogenated cardanol was changed to 3.8 g (0.010 mol) and the supply amount of phenylpropionyl chloride was changed to 2.7 g (0.016 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.13 and $DS_{PPA}$ was 0.35.

Furthermore, the sample was evaluated in the same manner as in Reference Example 1. The results are shown in Table 101C.

Reference Example 19

The chloridized and hydrogenated cardanol (cardanol derivative 2) prepared in Reference Synthesis Example 2 and cyclohexanecarboxylic acid chloride (CHC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (3.7 g (0.0096 mol)) prepared in Reference Synthesis Example 2 and cyclohexanecarboxylic acid chloride (CHC) (2.5 g (0.017 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.20 and $DS_{CHC}$ was 0.22.

Furthermore, the sample was evaluated in the same manner as in Reference Example 1. The results are shown in Table 101C.

Reference Example 20

The chloridized and hydrogenated cardanol (cardanol derivative 2) prepared in Reference Synthesis Example 2 and biphenylcarbonyl chloride (BCC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.6 g (0.012 mol)) prepared in Reference Synthesis Example 2 and biphenylcarbonyl chloride (BCC) (13.0 g (0.060 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.30 and $DS_{BCC}$ was 0.30.

Furthermore, the sample was evaluated in the same manner as in Reference Example 1. The results are shown in Table 101C.

Reference Example 21

The chloridized and hydrogenated cardanol (cardanol derivative 2) prepared in Reference Synthesis Example 2 was allowed to bind to cellulose acetate (trade name: LM-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, the grafted cellulose acetate was prepared in accordance with the following procedure.

Cellulose acetate (15.8 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (6.8 g (0.018 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.19.

Furthermore, the sample was evaluated in the same manner as in Reference Example 1. The results are shown in Table 102.

Reference Example 22

The chloridized and hydrogenated cardanol (cardanol derivative 2) prepared in Reference Synthesis Example 2 was allowed to bind to cellulose acetate (trade name:

LM-40, manufactured by Daicel Chemical Industries, Ltd., the number of acetic acid molecules added to a single glucose unit of cellulose (degree of acetylation: $DS_{Ace}$=2.4) to obtain grafted cellulose acetate. More specifically, grafted cellulose acetate (25 g) was prepared in accordance with the same content and manner as in Reference Example 21 except that the supply amount of chloridized and hydrogenated cardanol was changed to 41.2 g (0.108 mol).

The obtained sample (grafted cellulose acetate) was measured by $^1$H-NMR (product name: AV-400, 400 MHz, manufactured by Bruker), and $DS_{CD}$ was 0.50.

Furthermore, the sample was evaluated in the same manner as in Reference Example 1. The results are shown in Table 102.

Reference Example 23

The chloridized and hydrogenated cardanol (cardanol derivative 2) prepared in Reference Synthesis Example 2 was allowed to bind to cellulose acetate butyrate (trade name: CAB-381-20manufactured by Eastman Chemical Company, the number of acetic acid molecules added to a single glucose unit of cellulose (degree of acetylation: $DS_{Ace}$=1.0; the number of butyric acid molecules added to a single glucose unit of cellulose (degree of butyration: $DS_{Bu}$=1.66) to obtain grafted cellulose acetate butyrate. More specifically, the grafted cellulose acetate butyrate was prepared in accordance with the following procedure.

Cellulose acetate butyrate (10 g (hydroxy-group amount: 0.011 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.34.

Furthermore, the sample was evaluated in the same manner as in Reference Example 1. The results are shown in Table 103.

Reference Example 24

The chloridized and hydrogenated cardanol (cardanol derivative 2) prepared in Reference Synthesis Example 2 was allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$=0.18; the number of propionic acid molecules added to a single glucose unit of cellulose (degree of propionation: $DS_{Pr}$=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.34.

Furthermore, the sample was evaluated in the same manner as in Reference Example 1. The results are shown in Table 103.

Reference Example 25

The chloridized and hydrogenated cardanol (cardanol derivative 2) prepared in Reference Synthesis Example 2 and benzoyl chloride (BC) as a reactive hydrocarbon were allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$=0.18; the number of propionic acid molecules added to a single glucose unit of cellulose (degree of propionation: $DS_{Pr}$=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (4.5 g (0.012 mol)) prepared in Reference Synthesis Example 2 and benzoyl chloride (BC) (2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate ) was measured by $^1$H-NMR (product name: AV-400, 400 MHz, manufactured by Bruker), and $DS_{CD}$ was 0.21 and $DS_{BC}$ was 0.10.

Furthermore, the sample was evaluated in the same manner as in Reference Example 1. The results are shown in Table 103.

Reference Example 26

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. More specifically, the carboxylated and hydrogenated cardanol was prepared in accordance with the following procedure.

First, hydrogenated cardanol (80 g (0.26 mol)) was dissolved in methanol (120 mL). To this, an aqueous solution dissolving sodium hydroxide (64 g (1.6 mol)) in distilled water (40 mL) was added. Thereafter, at room temperature, a solution of monochloro acetic acid (66 g (0.70 mol))

manufactured by Kanto Chemical Co., Inc. dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The carboxylated and hydrogenated cardanol thus prepared was allowed to bind to cellulose (trade name: KC Flock W-50G manufactured by Nippon Paper Chemicals) to obtain grafted cellulose. More specifically, the grafted cellulose was prepared in accordance with the following procedure.

Cellulose (2.5 g (hydroxy-group amount: 47 mmol)) was suspended in methanol (100 mL) and stirred for one hour at room temperature and filtrated by suction. The solid substance separated by filtration was allowed to swell with dimethylacetamide (DMAc) (100 mL), stirred one hour at room temperature and filtrated by suction to remove the solvent. Thereafter, swelling with DMAc and solvent removal by suction filtration were repeated three times in the same manner. LiCl (21 g) was dissolved in DMAc (250 mL) and the DMAc-swollen cellulose previously obtained was mixed and stirred at room temperature overnight to obtain a cellulose solution. To the cellulose solution thus obtained, a DMAc solution (20 mL) dissolving the carboxylated and hydrogenated cardanol (17.3 g (46.5 mmol)), pyridine (11.0 g (140 mmol)) and tosyl chloride (8.8 g (46 mmol)) was added. The reaction solution was reacted by heating at 50° C. for one hour. The reaction solution was added dropwise to methanol (2 L) to allow reprecipitation. The resultant solid substance was separated by filtration, washed three times with methanol (500 mL) and dried under vacuum at 105° C. for 5 hours to obtain grafted cellulose (10.4 g). $DS_{CD}$ was obtained from the yield, and $DS_{CD}$ was 1.49. Furthermore, the sample was evaluated in the same manner as in Reference Example 1. The results are shown in Table 104.

Reference Comparative Example 1

The same cellulose acetate before grafting as that used in Reference Example 1 was used as a comparative sample.

The cellulose acetate was evaluated in the same manner as in Reference Example 1. The results are shown in Table 101C.

Note that the cellulose acetate did not melt even if heated and did not exhibit thermoplasticity. Furthermore, since the cellulose acetate could not be molded, a bending test was not performed.

Reference Comparative Example 2

To the same cellulose acetate before grafting as that used in Reference Example 1, triethyl citrate (trade name: Citroflex-2 manufactured by Pfizer Inc.) was added as a plasticizer such that the content became 45% by mass based on the whole resin composition. This was mixed by an extruder mixer (HAAKE MiniLab Rheomex extruder (Model CTW5, Thermo Electron Corp., Waltham, Mass.)) at a temperature of 200° C. and a screw rotation speed of 60 rpm to prepare a cellulose acetate resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 3

A cellulose acetate resin composition was prepared in accordance with the same content and manner as in Reference Comparative Example 2 except that the addition amount of triethyl citrate was set to 56% by mass based on the whole resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 4

A cellulose acetate resin composition was prepared in accordance with the same content and manner as in Reference Comparative Example 2 except that the addition amount of triethyl citrate was set to 34% by mass based on the whole resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 5

Phenylpropionyl chloride (PPA) was used as a reactive hydrocarbon and allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving phenylpropionyl chloride (PPA) (10 g (0.060 mol)) manufactured by Tokyo Kasei Kogyo Co., Ltd., was added. The reaction solution was heated to reflux at 100° C. for one hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (12 g).

The obtained sample (grafted cellulose acetate) was measured by $^1$H-NMR (product name: AV-400, 400 MHz, manufactured by Bruker), and $DS_{PP4}$ was 0.47.

The sample was evaluated in the same manner as in Reference Example 1. The results are shown in Table 101C.

Note that the cellulose acetate did not melt even if heated and did not exhibit thermoplasticity. Furthermore, since the cellulose acetate could not be molded, a bending test was not performed.

Reference Comparative Example 6

The same cellulose acetate before grafting ($DS_{Ace}$=2.4) as that used in Reference Example 21 was used as a comparative sample.

The cellulose acetate was evaluated in the same manner as in Reference Example 1. The results are shown in Table 102.

Note that the cellulose acetate did not melt even if heated and did not exhibit thermoplasticity. Furthermore, since the cellulose acetate could not be molded, a bending test was not performed.

Reference Comparative Example 7

To the same cellulose acetate ($DS_{Ace}$=2.4) before grafting as that used in Reference Example 21, triethyl citrate (trade name: Citroflex-2 manufactured by Pfizer Inc.) was added as a plasticizer such that the content became 20% by mass based on the whole resin composition. This was mixed by an extruder mixer (HAAKE MiniLab Rheomex extruder (Model CTW5, Thermo Electron Corp., Waltham, Mass.)) at a temperature of 190° C. and a screw rotation speed of 60 rpm) to prepare a cellulose acetate resin composition.

The resin composition was evaluated in the same manner as in Reference Example 1. The results are shown in Table 102.

Note that when the resin composition was casted, a phase separation occurred and a uniform film could not be prepared. Thus, a tensile test was not performed.

Reference Comparative Example 8

A cellulose acetate resin composition was prepared in accordance with the same content and manner as in Reference Comparative Example 7 except that the addition amount of triethyl citrate was set to 40% by mass based on the whole resin composition.

The resin composition was evaluated in the same manner as in Reference Example 1. The results are shown in Table 102.

Note that when the resin composition was casted, a phase separation occurred and a uniform film could not be prepared. Thus, a tensile test was not performed.

Reference Comparative Examples 9 and 10

The same cellulose acetate butyrate and cellulose acetate propionate before grafting as those that used in Reference Examples 23 and 24 were used as comparative samples respectively.

The cellulose acetate butyrate and cellulose acetate propionate were evaluated in the same manner as in Reference Example 1. The results are shown in Table 103.

Note that the cellulose acetate butyrate and cellulose acetate propionate melted when heated. They had thermoplasticity; however, melt viscosity was extremely large. Since it was difficult to mold them, a bending test was not performed.

Reference Comparative Examples 11 and 12

To each of the same cellulose acetate butyrate and cellulose acetate propionate before grafting as those used in Reference Examples 23 and 24 respectively, triethyl citrate (trade name: Citroflex-2 manufactured by Pfizer Inc.) was added as a plasticizer such that the content became 27% by mass based on the whole resin composition. This was mixed by an extruder mixer (HAAKE MiniLab Rheomex extruder (Model CTW5, Thermo Electron Corp., Waltham, Mass.)) at a temperature of 180° C. and a screw rotation speed of 60 rpm to prepare a cellulose acetate butyrate resin composition and a cellulose acetate propionate resin composition.

The resin compositions were evaluated in the same manner as in Reference Example 1. The results are shown in Table 103.

Note that when each of the resin compositions was casted, a phase separation occurred and a uniform film could not be prepared. Thus, a tensile test was not performed.

Reference Comparative Example 13

To compare with Reference Example 26, a resin composition composed of cellulose acetate and triethyl citrate as a plasticizer was prepared in accordance with the same manner as in Reference Comparative Example 2 except that the addition amount of the plasticizer was changed to 63% by mass based on the whole resin composition. The total amount of plasticizer and acetyl group was set to be equal to the amount of cardanol of Reference Example 26. The resin composition was evaluated in the same manner as in Reference Example 1. The results are shown in Table 104.

Note that when the resin composition was casted, a phase separation occurred and a uniform film could not be prepared. Thus, a tensile test was not performed.

Reference Comparative Example 14

An unsaturated bond of cardanol represented by the above Formula (2) (LB-7000: a mixture of 3-pentadecylphenol (about 5%), 3-pentadecylphenol monoene (about 35%), 3-pentadecylphenol diene (about 20%), 3-pentadecylphenol triene (about 40%); manufactured by Tohoku Chemical Industries, Ltd.) was chemically bound to a hydroxy group of a cellulose (trade name: KC Flock W-50G manufactured by Nippon Paper Chemicals) to obtain cardanol-grafted cellulose. More specifically, the cardanol-grafted cellulose was prepared in accordance with the following procedure.

In a dry box, a reaction solvent was prepared from borontrifluoride diethyl ether ($BF_3$—$OEt_2$) (manufactured by Kanto Chemical Co., Inc.) (80 mL) and methylene chloride (100 mL) (manufactured by Kanto Chemical Co., Inc.) under a nitrogen gas atmosphere. To this, cellulose (2 g) was added and the mixture was stirred at room temperature for 2 hours. Thereafter, the cellulose was separated by filtration from the reaction solvent and dried under vacuum. Thereafter, to this, liquid-state cardanol (LB-7000) (100 mL) as mentioned above was added and a grafting reaction was performed while stirring at room temperature for 3 hours. After completion of the reaction, a product was separated by filtration, washed with acetone, extracted by Soxhlet and dried under vacuum at 105° C. for 5 hours to obtain a desired cardanol-grafted cellulose composition (2.5 g). $DS_{CD}$ was obtained from a yield, and $DS_{CD}$ was 0.16.

Note that the composition did not melt even if heated and did not exhibit thermoplasticity. Furthermore, since the composition could be neither molded nor casted, evaluation, such as a bending test and tensile test, was not performed.

TABLE 101A

|  |  | Reference Example 1 | Reference Example 2 | Reference Example 3 | Reference Example 4 | Reference Example 5 | Reference Example 6 |
| --- | --- | --- | --- | --- | --- | --- | --- |
| Amount of acetyl group | $DS_{Ace}$ | 2.1 | 2.1 | 2.1 | 2.1 | 2.1 | 2.1 |
|  | Mass fraction (%) | 16 | 20 | 21 | 21 | 23 | 26 |
| Amount of cardanol derivative | $DS_{CD}$ modified with succinic acid | 0.90 | 0.55 | 0 | 0 | 0 | 0 |
|  | $DS_{CD}$ modified with monochloro acetic acid | 0 | 0 | 0.55 | 0.80 | 0.44 | 0.30 |
|  | Mass fraction (%) | 56 | 46 | 43 | 53 | 38 | 29 |
| Amount of reactive hydrocarbon compound | $DS_{XX}$ | 0 | 0 | 0 | 0 | 0 | 0 |
|  | Mass fraction (%) | 0 | 0 | 0 | 0 | 0 | 0 |
| Addition amount of plasticizer (% by mass) |  | 0 | 0 | 0 | 0 | 0 | 0 |
| Bending strength (MPa) |  | 38 | 48 | 50 | 36 | 60 | 83 |
| Bending elastic modulus (GPa) |  | 0.80 | 1.1 | 1.2 | 0.80 | 1.4 | 1.9 |
| Bend-breaking strain (%) |  | >10 | >10 | >10 | >10 | >10 | >10 |
| Tensile strength (MPa) |  | 29 | 36 | 38 | 27 | 45 | 59 |
| Tensile elastic modulus (GPa) |  | 0.6 | 0.9 | 1.0 | 0.6 | 1.2 | 1.7 |
| Tensile breaking strain (%) |  | 57 | 55 | 53 | 57 | 51 | 48 |
| Glass transition temperature (° C.) (heat resistance) |  | 125 | 134 | 147 | 139 | 142 | 150 |
| Thermoplasticity (press moldability) |  | ◯ | ◯ | ◯ | ◯ | ◯ | ◯ |
| Water absorption rate (%) |  | 1.1 | 1.5 | 1.2 | 0.94 | 1.3 | 1.7 |
| Plant component ratio (%) |  | 71 | 70 | 73 | 76 | 72 | 71 |

TABLE 101B

|  |  | Reference Example 7 | Reference Example 8 | Reference Example 9 | Reference Example 10 | Reference Example 11 | Reference Example 12 | Reference Example 13 | Reference Example 14 | Reference Example 15 | Reference Example 16 |
| --- | --- | --- | --- | --- | --- | --- | --- | --- | --- | --- | --- |
| Amount of acetyl group | $DS_{Ace}$ | 2.1 | 2.1 | 2.1 | 2.1 | 2.1 | 2.1 | 2.1 | 2.1 | 2.1 | 2.1 |
|  | Mass fraction (%) | 25 | 26 | 21 | 24 | 25 | 31 | 24 | 20 | 18 | 20 |
| Amount of cardanol derivative | $DS_{CD}$ modified with succinic acid | 0 | 0 | 0 | 0 | 0 | 0 | 0 | 0 | 0 | 0 |
|  | $DS_{CD}$ modified with monochloro acetic acid | 0.30 | 0.22 | 0.44 | 0.24 | 0.30 | 0.08 | 0.27 | 0.40 | 0.55 | 0.30 |
|  | Mass fraction (%) | 28 | 22 | 36 | 22 | 29 | 9.4 | 25 | 30 | 39 | 23 |
| Amount of reactive hydrocarbon compound | $DS_{XX}$ | xx = BC | xx = BC | xx = BC | xx = BC | xx = BC | xx = BC | xx = BAA | xx = BAA | xx = BAA | xx = BAA |
|  |  | 0.14 | 0.27 | 0.22 | 0.42 | 0.07 | 0.16 | 0.15 | 0.40 | 0.28 | 0.52 |
|  | Mass fraction (%) | 4.0 | 8.0 | 5.4 | 12 | 1.8 | 5.7 | 7.3 | 16 | 11 | 21 |
| Addition amount of plasticizer (% by mass) |  | 0 | 0 | 0 | 0 | 0 | 0 | 0 | 0 | 0 | 0 |
| Bending strength (MPa) |  | 113 | 118 | 106 | 112 | 94 | 95 | 106 | 107 | 93 | 95 |
| Bending elastic modulus (GPa) |  | 2.2 | 2.6 | 2.1 | 2.2 | 1.9 | 2.9 | 2.5 | 2.0 | 1.9 | 2.1 |
| Bend-breaking strain (%) |  | >10 | >10 | >10 | >10 | >10 | 6.5 | >10 | >10 | >10 | >10 |
| Tensile strength (MPa) |  | 69 | 72 | 66 | 70 | 64 | 75 | 65 | 65 | 63 | 64 |
| Tensile elastic modulus (GPa) |  | 1.6 | 1.8 | 1.6 | 1.6 | 1.5 | 1.9 | 1.8 | 1.5 | 1.4 | 1.6 |
| Tensile breaking strain (%) |  | 48 | 47 | 52 | 47 | 50 | 30 | 45 | 46 | 48 | 45 |
| Glass transition temperature (° C.) (heat resistance) |  | 154 | 155 | 144 | 156 | 152 | 158 | 148 | 150 | 142 | 147 |
| Thermoplasticity (press moldability) |  | ◯ | ◯ | ◯ | ◯ | ◯ | ◯ | ◯ | ◯ | ◯ | ◯ |
| Water absorption rate (%) |  | 1.3 | 1.6 | 1.1 | 1.2 | 1.4 | 1.9 | 1.0 | 0.72 | 0.68 | 0.65 |
| Plant component ratio (%) |  | 68 | 64 | 68 | 61 | 69 | 62 | 65 | 60 | 66 | 55 |

TABLE 101C

| | | Reference Example 17 | Reference Example 18 | Reference Example 19 | Reference Example 20 | Reference Comparative Example 1 | Reference Comparative Example 2 | Reference Comparative Example 3 | Reference Comparative Example 4 | Reference Comparative Example 5 |
|---|---|---|---|---|---|---|---|---|---|---|
| Amount of acetyl group | $DS_{Ace}$ | 2.1 | 2.1 | 2.1 | 2.1 | 2.1 | 2.1 | 2.1 | 2.1 | 2.1 |
| | Mass fraction (%) | 26 | 27 | 26 | 22 | 36 | 20 | 16 | 24 | 29 |
| Amount of cardanol derivative | $DS_{CD}$ modified with succinic acid | 0 | 0 | 0 | 0 | 0 | 0 | 0 | 0 | 0 |
| | $DS_{CD}$ modified with monochloro acetic acid | 0.17 | 0.13 | 0.20 | 0.30 | 0 | 0 | 0 | 0 | 0 |
| | Mass fraction (%) | 17 | 13 | 20 | 25 | 0 | 0 | 0 | 0 | 0 |
| Amount of reactive hydrocarbon compound | $DS_{XX}$ | xx = PPA 0.25 | xx = PPA 0.35 | xx = CHC 0.22 | xx = CHC 0.30 | 0 | 0 | 0 | 0 | xx = PPA 0.47 |
| | Mass fraction (%) | 9.7 | 14 | 7.1 | 13 | 0 | 0 | 0 | 0 | 20 |
| Addition amount of plasticizer (% by mass) | | 0 | 0 | 0 | 0 | 0 | 45 | 56 | 34 | 0 |
| Bending strength (MPa) | | 106 | 108 | 111 | 109 | — | 15 | 11 | 24 | — |
| Bending elastic modulus (GPa) | | 2.5 | 2.6 | 2.5 | 2.5 | — | 0.41 | 0.29 | 0.72 | — |
| Bend-breaking strain (%) | | >10 | >10 | >10 | >10 | — | >10 | >10 | >10 | — |
| Tensile strength (MPa) | | 65 | 66 | 68 | 67 | 60 | — | — | — | 52 |
| Tensile elastic modulus (GPa) | | 1.4 | 1.4 | 1.6 | 1.5 | 2.3 | — | — | — | 1.9 |
| Tensile breaking strain (%) | | 60 | 58 | 55 | 50 | 9.0 | — | — | — | 16 |
| Glass transition temperature (° C.) (heat resistance) | | 143 | 142 | 146 | 150 | 227 | 40 | 25 | 71 | 152 |
| Thermoplasticity (press moldability) | | ○ | ○ | ○ | ○ | x | ○ | ○ | ○ | x |
| Water absorption rate (%) | | 1.9 | 1.8 | 1.8 | 1.4 | 17 | 5.1 | 4.3 | 5.7 | 4.5 |
| Plant component ratio (%) | | 61 | 58 | 64 | 65 | 64 | 35 | 28 | 42 | 51 |

TABLE 102

| | | Reference Example 21 | Reference Example 22 | Reference Comparative Example 6 | Reference Comparative Example 7 | Reference Comparative Example 8 |
|---|---|---|---|---|---|---|
| Amount of acetyl group | $DS_{Ace}$ | 2.4 | 2.4 | 2.4 | 2.4 | 2.4 |
| | Mass fraction (%) | 31 | 24 | 31 | 39 | 24 |
| Amount of cardanol derivative | $DS_{CD}$ modified with monochloro acetic acid | 0.19 | 0.50 | 0 | 0 | 0 |
| | Mass fraction (%) | 20 | 40 | 0 | 0 | 0 |
| Addition amount of plasticizer (% by mass) | | 0 | 0 | 0 | 20 | 40 |
| Bending strength (MPa) | | 120 | 59 | — | 50 | 20 |
| Bending elastic modulus (GPa) | | 2.8 | 1.5 | — | 2.3 | 0.80 |
| Bend-breaking strain (%) | | >10 | >10 | — | >10 | >10 |
| Tensile strength (MPa) | | 55 | 38 | 58 | — | — |
| Tensile elastic modulus (GPa) | | 1.8 | 1.0 | 2.1 | — | — |
| Tensile breaking strain (%) | | 34 | 53 | 11 | — | — |
| Glass transition temperature (° C.) (heat resistance) | | 154 | 134 | 216 | 90 | 63 |
| Thermoplasticity (press moldability) | | ○ | ○ | x | ○ | ○ |
| Water absorption rate (%) | | 2.1 | 1.2 | 9.0 | 3.1 | 2.6 |
| Plant component ratio (%) | | 66 | 71 | 61 | 49 | 36 |

TABLE 103

| | | Reference Example 23 | Reference Example 24 | Reference Example 25 | Reference Comparative Example 9 | Reference Comparative Example 10 | Reference Comparative Example 11 | Reference Comparative Example 12 |
|---|---|---|---|---|---|---|---|---|
| Amount of acetyl group | $DS_{Ace}$ | 1.0 | 0.18 | 0.18 | 1.0 | 0.18 | 1.0 | 0.18 |
| | Mass fraction (%) | 9.8 | 1.8 | 2.0 | 13 | 2.5 | 9.8 | 1.8 |
| Amount of | $DS_{Bu}$ or $DS_{Pr}$ | $DS_{Bu}$ | $DS_{Pr}$ | $DS_{Pr}$ | $DS_{Bu}$ | $DS_{Pr}$ | $DS_{Bu}$ | $DS_{Pr}$ |

TABLE 103-continued

|  |  | Reference Example 23 | Reference Example 24 | Reference Example 25 | Reference Comparative Example 9 | Reference Comparative Example 10 | Reference Comparative Example 11 | Reference Comparative Example 12 |
|---|---|---|---|---|---|---|---|---|
| butyryl/propionyl group |  | 1.66 | 2.49 | 2.49 | 1.66 | 2.49 | 1.66 | 2.49 |
|  | Mass fraction (%) | 27 | 27 | 36 | 37 | 46 | 27 | 34 |
| Amount of cardanol derivative | $DS_{CD}$ modified with monochloro acetic acid | 0.34 | 0.33 | 0.21 | 0 | 0 | 0 | 0 |
|  | Mass fraction (%) | 27 | 27 | 19 | 0 | 0 | 0 | 0 |
| Amount of reactive hydrocarbon compound | $DS_{XX}$ | 0 | 0 | xx = BC 0.10 | 0 | 0 | 0 | 0 |
|  | Mass fraction (%) | 0 | 0 | 2.7 | 0 | 0 | 0 | 0 |
| Addition amount of plasticizer (% by mass) |  | 0 | 0 | 0 | 0 | 0 | 27 | 27 |
| Bending strength (MPa) |  | 45 | 49 | 60 | — | — | 23 | 15 |
| Bending elastic modulus (GPa) |  | 1.3 | 1.4 | 1.6 | — | — | 0.79 | 0.82 |
| Bend-breaking strain (%) |  | >10 | >10 | >10 | — | — | >10 | >10 |
| Tensile strength (MPa) |  | 35 | 39 | 43 | 36 | 40 | — | — |
| Tensile elastic modulus (GPa) |  | 0.85 | 0.87 | 1.0 | 1.0 | 1.1 | — | — |
| Tensile breaking strain (%) |  | 100 | 98 | 82 | 55 | 52 | — | — |
| Glass transition temperature (° C.) (heat resistance) |  | 94 | 92 | 100 | 135 | 143 | 59 | 59 |
| Thermoplasticity (press moldability) |  | ◯ | ◯ | ◯ | Δ | Δ | ◯ | ◯ |
| Water absorption rate (%) |  | 0.65 | 0.76 | 0.74 | 2.6 | 3.1 | 1.5 | 1.6 |
| Plant component ratio (%) |  | 60 | 61 | 57 | 50 | 52 | 36 | 38 |

TABLE 104

|  |  | Reference Example 26 | Reference Comparative Example 13 |
|---|---|---|---|
| Amount of cellulose | Mass fraction (%) | 24 | 24 |
| Amount of acetyl group | $DS_{Ace}$ | 0 | 2.1 |
|  | Mass fraction (%) | 0 | 13 |
| Amount of cardanol derivative | $DS_{CD}$ modified with monochloro acetic acid | 1.49 | 0 |
|  | Mass fraction (%) | 76 | 0 |
| Addition amount of plasticizer (% by mass) |  | 0 | 63 |
| Bending strength (MPa) |  | 25 | 9 |
| Bending elastic modulus (GPa) |  | 0.38 | 0.20 |
| Bend-breaking strain (%) |  | >10 | >10 |
| Tensile strength (MPa) |  | 17 | — |
| Tensile elastic modulus (GPa) |  | 0.26 | — |
| Tensile breaking strain (%) |  | 22 | — |
| Glass transition temperature (° C.) (heat resistance) |  | 84 | 21 |
| Thermoplasticity (press moldability) |  | ◯ | ◯ |
| Water absorption rate (%) |  | 1.9 | 4.0 |
| Plant component ratio (%) |  | 89 | 24 |

When Reference Examples 1 to 6 are compared to Reference Comparative Example 1, the cardanol-grafted cellulose resins (an acetyl group is also added to a cellulose hydroxy group) of the reference examples each had thermoplasticity (press moldability) and excellent bending properties without reducing a plant component ratio, and further tensile properties (particularly, breaking strain) and water resistance (water absorption rate) were improved, compared to the cellulose derivative (cellulose acetate) before grafting which had no thermoplasticity. Furthermore, when Reference Examples 1 to 6 are compared to Reference Comparative Examples 2 to 4, the cardanol-grafted cellulose resins (an acetyl group is also added to a cellulose hydroxy group) of the reference examples were more improved in bending properties, tensile properties and water resistance than the cellulose derivatives before grafting (cellulose acetate) which contained the plasticizer. In addition, high heat resistance (glass transition temperature) was obtained without reducing the plant component ratio.

As shown in Reference Examples 7 to 20, bending properties (particularly, bending strength) and tensile properties (particularly, tensile strength) can be even more improved while obtaining high water resistance by grafting with not only cardanol but also a reactive hydrocarbon.

In Reference Examples 21 and 22 and Reference Comparative Examples 6 to 8, compared to Reference Examples 1 to 20 and Reference Comparative Examples 1 to 5, the amount of acetyl group added to a hydroxy group of cellulose is increased. Even in these case, when Reference Examples 21 and 22 are compared to Reference Comparative Example 6, the cardanol-grafted cellulose resins of the reference examples each had thermoplasticity and excellent bending properties without reducing a plant component ratio, and further tensile properties (particularly, breaking strain) and water resistance were improved, compared to the cellulose derivative before grafting which had no thermoplasticity. Furthermore, when Reference Examples 21 and 22 are compared to Reference Comparative Examples 7 and 8, the cardanol-grafted cellulose resins of the reference examples were more improved in bending properties (particularly, bending strength), tensile properties and water resistance than the cellulose derivatives before grafting which contained the plasticizer. In addition, high heat resistance was obtained without reducing the plant component ratio.

As shown in Reference Comparative Examples 2 to 4, 7 and 8 containing plasticizer, excellent heat resistance was not obtained by adding the plasticizer alone. According to the reference examples, not only thermoplasticity can be imparted to a cellulose resin but also excellent heat resistance can be obtained.

Furthermore, as shown in Reference Comparative Example 5 in which a reactive hydrocarbon alone was grafted, thermoplasticity was not obtained only by grafting a reactive hydrocarbon alone, and bending properties, tensile properties (particularly, breaking strain) and water resistance were not improved. According to the reference example, not only thermoplasticity can be imparted to a cellulose resin but also excellent bending properties, tensile properties (particularly, breaking strain) and water resistance can be obtained.

Reference Examples 23 to 25 and Reference Comparative Examples 9 to 12, each are an example of a cellulose resin prepared by using a cellulose derivative having not only an acetyl group but also a butyryl group or a propionyl group added to a hydroxy group. Even in these case, when Reference Examples 23 to 25 are compared to Reference Comparative Examples 9 and 10, in the cardanol-grafted cellulose resins of the reference examples, excellent thermoplasticity and bending properties were obtained without reducing the plant component ratio, and further tensile properties (particularly breaking strain) and water resistance were improved, compared to the cellulose derivatives before grafting. Furthermore, when Reference Examples 23 to 25 and Reference Comparative Examples 11 and 12 are compared, the cardanol-grafted cellulose resins of the reference examples were more improved in bending properties (particularly, bending strength), tensile properties and water resistance than the cellulose derivatives before grafting which contained the plasticizer. In addition, high heat resistance was obtained without reducing the plant component ratio.

Reference Example 26 is an example of a cellulose resin prepared by using cellulose having a hydroxy group of cellulose to which an acyl group such as an acetyl group is not added. Even in this case, when Reference Example 26 is compared to Reference Comparative Example 13, the cardanol-grafted cellulose resin of the reference example was more improved in bending properties (particularly, bending strength), tensile properties and water resistance than the cellulose derivative of Reference Comparative Example 13, in which the cellulose derivative (cellulose acetate) contained a plasticizer (the weight ratio of the cellulose component is the same as the Reference Example 26). In addition, high heat resistance was obtained without reducing the plant component ratio.

As described above, according to the reference examples, it is possible to provide a cellulose resin improved in water resistance and having good thermoplasticity (press moldability) and sufficient heat resistance while maintaining a high plant component ratio (high vegetism). Furthermore, a press molded product having high bending properties can be obtained and a film molded product can be improved in tensile properties (particularly, toughness). Furthermore, according to the reference examples, a grafted cellulose resin having a high plant component ratio as well as high utilization ratio of non-edible parts can be obtained.

While the present invention has been described with reference to the exemplary embodiments, the present invention is not limited to the above exemplary embodiments. Various changes that can be understood by those skilled in the art may be made to the constitution and details of the present invention within the scope thereof.

This application claims the right of priority based on Japanese Patent Application No. 2010-177950 filed on Aug. 6, 2010, the entire content of which is incorporated herein by reference.

The invention claimed is:

1. A cellulose resin composition comprising:
a cellulose resin produced by binding cardanol or a derivative thereof to cellulose or a derivative thereof; and
a cardanol-modified silicone compound produced by binding cardanol or a derivative thereof to a silicone compound.

2. The cellulose resin composition according to claim 1, wherein the silicone compound comprises a functional group, and
the cardanol-modified silicone compound is a compound produced by binding the cardanol or a derivative thereof to the silicone compound by use of the functional group of the silicone compound and a phenolic hydroxy group of the cardanol or a derivative thereof.

3. The cellulose resin composition according to claim 2, wherein the functional group of the silicone compound is selected from the group consisting of an epoxy group, an amino group, a hydroxy group and a carboxyl group.

4. The cellulose resin composition according to claim 3, wherein in the cardanol-modified silicone compound, a silicon atom to which a group having the functional group is bound and a cardanol carbon atom to which the phenolic hydroxy group is bound are linked via an organic linking group, and
the organic linking group comprises a first bond selected from the group consisting of an amide bond, an ester bond, an ether bond and a urethane bond on a side of the silicon atom, and a second bond selected from the group consisting of an ester bond, an ether bond and a urethane bond on a side of the cardanol carbon atom.

5. The cellulose resin composition according to claim 4, wherein the organic linking group of the cardanol-modified silicone compound comprising the first and second groups further comprises a divalent hydrocarbon group having 1 to 20 carbon atoms.

6. The cellulose resin composition according to claim 1, wherein a content of the cardanol-modified silicone compound is 1% by mass or more and 20% by mass or less, based on the total amount of the cardanol-modified silicone compound and the cellulose resin.

7. The cellulose resin composition according to claim 1, wherein the cardanol or a derivative thereof is bound to the cellulose or a derivative thereof by a connection between a hydroxy group of the cellulose or a derivative thereof and a phenolic hydroxy group of the cardanol or a derivative thereof.

8. The cellulose resin composition according to claim 7, wherein in the cellulose resin, a cellulose carbon atom to which the hydroxy group is bound and a cardanol carbon atom to which the phenolic hydroxy group is bound are linked via an organic linking group, and
the organic linking group comprises a first bond binding to the cellulose carbon atom, the first bonding being selected from the group consisting of an ester bond, an ether bond and a urethane bond, and a second bond binding to the cardanol carbon atom, the second bond being selected from the group consisting of an ester bond, an ether bond and a urethane bond.

9. The cellulose resin composition according to claim 8, wherein the organic linking group of the cellulose resin further comprises a divalent hydrocarbon group having 1 to 20 carbon atoms.

10. The cellulose resin composition according to claim 1, wherein in the cellulose resin, a number of molecules of the cardanol or a derivative thereof added to the cellulose or a derivative thereof per glucose unit, the number being abbreviated as $DS_{CD}$, is 0.1 or more.

11. The cellulose resin composition according to claim 1, adding a reactive hydrocarbon compound, comprising a functional group capable of reacting with the hydroxy group, to a hydroxy group of the cellulose or a derivative thereof.

12. The cellulose resin composition according to claim 11, wherein the reactive hydrocarbon compound is a hydrocarbon compound comprising a carboxyl group, a carboxylic halide group or a carboxylic acid anhydride group.

13. The cellulose resin composition according to claim 11, wherein the reactive hydrocarbon compound comprises at least one monocarboxylic acid, an acid halide thereof or acid anhydride thereof, the monocarboxylic acid being selected from the group consisting of an aliphatic carboxylic acid, an aromatic carboxylic acid and an alicyclic carboxylic acid.

14. The cellulose resin composition according to claim 11, wherein in the cellulose resin, a number of molecules of the reactive hydrocarbon compound added to the cellulose or a derivative thereof per glucose unit, the number being abbreviated as $DS_{XX}$, is 0.1 or more.

15. The cellulose resin composition according to claim 1, wherein in the cellulose resin, at least one acyl group selected from the group consisting of an acetyl group, a propionyl group and a butyryl group is added to a cellulose hydroxy group.

16. The cellulose resin composition according to claim 1, wherein in the cellulose resin, at least one first acyl group selected from the group consisting of an acetyl group, a propionyl group and a butyryl group is added to a cellulose hydroxy group, and a second acyl group derived from at least one monocarboxylic acid selected from the group consisting of an aromatic carboxylic acid and an alicyclic carboxylic acid is added to another cellulose hydroxy group.

17. The cellulose resin composition according to claim 1, wherein in the cellulose resin, a number of remaining hydroxy groups per glucose unit, the number being abbreviated as $DS_{OH}$, is 0.9 or less.

18. The cellulose resin composition according to claim 1, wherein a plant component ratio of the cellulose resin is 50% by mass or more, the ratio being defined as a ratio of a sum of cellulose moiety and cardanol moiety based on the cellulose resin.

19. The cellulose resin composition according to claim 1, wherein an unsaturated bond of the cardanol or a derivative thereof is hydrogenated.

20. A molding material comprising the resin composition as recited in claim 1.

21. The cellulose resin composition according to claim 16, wherein a number of the second acyl groups added to the cellulose or a derivative thereof per glucose unit, the number being abbreviated as $DS_{XX}$, is 0.1 or more.

22. The cellulose resin composition according to claim 1, wherein in the cellulose resin, a number of molecules of the cardanol or a derivative thereof added to the cellulose or a derivative thereof per glucose unit, the number being abbreviated as $DS_{CD}$, is 0.2 or more and 1.5 or less.

23. The cellulose resin composition according to claim 11, wherein in the cellulose resin, a number of molecules of the reactive hydrocarbon compound added to the cellulose or a derivative thereof per glucose unit, the number being abbreviated as $DS_{XX}$, is 0.1 or more and 0.6 or less.

24. The cellulose resin composition according to claim 15, wherein in the cellulose resin, a number of the acyl group per glucose unit, the number being abbreviated as $DS_{AC}$, is 0.5 or more and 2.7 or less.

25. The cellulose resin composition according to claim 15, wherein in the cellulose resin, a number of the acyl group per glucose unit, the number being abbreviated as $DS_{AC}$, is 0.5 or more and 2.5 or less.

26. The cellulose resin composition according to claim 4, wherein the organic linking group of the cardanol-modified silicone compound further comprises a divalent hydrocarbon group having 1 to 8 carbon atoms.

27. The cellulose resin composition according to claim 8, wherein the organic linking group of the cellulose resin further comprises a divalent hydrocarbon group having 1 to 8 carbon atoms.

28. The cellulose resin composition according to claim 1, wherein the number average molecular weight of the silicone compound is in a range of 900 to 50000.

29. The cellulose resin composition according to claim 1, wherein the content of cardanol or a derivative thereof in the cardanol-modified silicone compound is in a range of 0.5% by mass to 20% by mass.

* * * * *

UNITED STATES PATENT AND TRADEMARK OFFICE
CERTIFICATE OF CORRECTION

PATENT NO. : 9,487,646 B2
APPLICATION NO. : 13/813608
DATED : November 8, 2016
INVENTOR(S) : Sungil Moon, Masatoshi Iji and Shukichi Tanaka It is certified that error appears in the above-identified patent and that said Letters Patent is hereby corrected as shown below:

In the Specification

Column 29, Line 55: After "of", insert --acetic--

Column 31, Line 42: After "of", insert --acetylation: $DS_{Ace}$) = 2.1) to obtain grafted cellulose acetate. More specifically, preparation--

Column 37, Line 41: Delete "propionate" and insert --butyrate--

Column 37, Line 42: Delete "propionate)" and insert --butyrate)--

Column 45, Line 19: Delete "CHC" and insert --BCC--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*